US009275002B2

(12) United States Patent
Manet et al.

(10) Patent No.: US 9,275,002 B2
(45) Date of Patent: Mar. 1, 2016

(54) TILE-BASED PROCESSOR ARCHITECTURE MODEL FOR HIGH-EFFICIENCY EMBEDDED HOMOGENEOUS MULTICORE PLATFORMS

(76) Inventors: Philippe Manet, Brussels (BE); Bertrand Rousseau, Chastre (BE)

( * ) Notice: Subject to any disclaimer, the term of this patent is extended or adjusted under 35 U.S.C. 154(b) by 713 days.

(21) Appl. No.: 13/576,219

(22) PCT Filed: Jan. 31, 2011

(86) PCT No.: PCT/EP2011/051297
§ 371 (c)(1),
(2), (4) Date: Jul. 31, 2012

(87) PCT Pub. No.: WO2011/092323
PCT Pub. Date: Aug. 4, 2011

(65) Prior Publication Data
US 2012/0303933 A1 Nov. 29, 2012

(30) Foreign Application Priority Data
Feb. 1, 2010 (GB) .................................. 1001621.0

(51) Int. Cl.
*G06F 15/76* (2006.01)
*G06F 15/173* (2006.01)
*G06F 9/38* (2006.01)
*G06F 15/78* (2006.01)

(52) U.S. Cl.
CPC ........ *G06F 15/17337* (2013.01); *G06F 9/3885* (2013.01); *G06F 9/3891* (2013.01); *G06F 15/7842* (2013.01); *Y02B 60/1225* (2013.01)

(58) Field of Classification Search
None
See application file for complete search history.

(56) References Cited

U.S. PATENT DOCUMENTS

| 5,471,593 | A | * | 11/1995 | Branigin ....................... 712/235 |
| 7,552,312 | B2 | * | 6/2009 | Archer ............. G06F 15/17337 712/10 |
| 7,577,820 | B1 | * | 8/2009 | Wentzlaff et al. ............... 712/10 |
| 7,814,295 | B2 | * | 10/2010 | Inglett .................. G06F 9/5061 712/20 |
| 7,831,802 | B2 | * | 11/2010 | Budnik ................. G06F 15/161 712/20 |
| 7,831,803 | B2 | * | 11/2010 | Inglet .................... G06F 9/5061 712/20 |
| 7,979,674 | B2 | * | 7/2011 | Inglett .................. G06F 9/5061 712/20 |
| 8,656,141 | B1 | * | 2/2014 | Agarwal ............. G06F 15/7867 710/22 |

(Continued)

FOREIGN PATENT DOCUMENTS

WO      WO 2007056737 A2 *  5/2007

OTHER PUBLICATIONS

"A Quantitative Comparison of Reconfigurable, Tiled, and Conventional Architectures on Bit-Level Computation" by David Wentzlaff and Anant Agarwal, MIT, Apr. 2004.*

(Continued)

*Primary Examiner* — Steven Snyder
(74) *Attorney, Agent, or Firm* — Young & Thompson

(57) ABSTRACT

The present invention relates to a processor which comprises processing elements that execute instructions in parallel and are connected together with point-to-point communication links called data communication links (DCL). The instructions use DCLs to communicate data between them. In order to realize those communications, they specify the DCLs from which they take their operands, and the DCLs to which they write their results. The DCLs allow the instructions to synchronize their executions and to explicitly manage the data they manipulate. Communications are explicit and are used to realize the storage of temporary variables, which is decoupled from the storage of long-living variables.

13 Claims, 13 Drawing Sheets

(56) References Cited

U.S. PATENT DOCUMENTS

| | | | |
|---|---|---|---|
| 2004/0010321 A1* | 1/2004 | Morishita et al. | 700/2 |
| 2008/0235490 A1* | 9/2008 | Jones et al. | 712/15 |
| 2008/0244238 A1* | 10/2008 | Mitu | 712/220 |
| 2008/0294871 A1 | 11/2008 | Pappalardo et al. | |
| 2010/0145992 A1* | 6/2010 | Rakib et al. | 707/781 |
| 2010/0145993 A1* | 6/2010 | Rakib et al. | 707/781 |
| 2010/0281234 A1* | 11/2010 | Ahmed et al. | 712/2 |
| 2010/0281236 A1* | 11/2010 | Rakib et al. | 712/17 |
| 2013/0117521 A1* | 5/2013 | Li et al. | 711/170 |
| 2014/0006714 A1* | 1/2014 | Cherukuri et al. | 711/128 |

OTHER PUBLICATIONS

"Energy Characterization of a Tiled Architecture Processor with On-Chip Networks" by Jason Sungtae Kim et al., copyright 2003 by ACM.*

International Search Report dated Jun. 24, 2011, in corresponding PCT application.

Ahmed Jerraya et al., Abstract of "Multiprocessor Systems-on-Chips", Sep. 2004.

Bruno Bougard et al., "A Coarse-Grained Array Accelerator for Software-Defined Radio Baseband Processing", IEEE Micro, 2008, pp. 41-50, vol. 28.

Hartej Singh et al., "MorphoSys: An Integrated Reconfigurable System for Data-Parallel and Computation-Intensive Applications", IEEE Transactions on Computers, May 2000, pp. 465-481, vol. 49, No. 5.

V. Baumgarte et al., "PACT XPP—A Self-Reconfigurable Data Processing Architecture", The Journal of Supercomputing, 2003, pp. 167-184, vol. 26.

Paul M. Heysters et al., "Flexibility of the Montium Word-Level Reconfigurable Processing Tile", Proceedings of the 4th Progress Symposium on Embedded Systems, 2003, pp. 102-108.

Mike Butts, "Synchronization Through Communication in a Massively Parallel Processor Array", IEEE Micro, 2007, pp. 32-40.

Michael Bedford Taylor et al., "The Raw Microprocessor: A Computational Fabric for Software Circuits and General-Purpose Programs", IEEE Micro, 2002, pp. 25-35.

Sudeep Pasricha et al., "On-Chip Communication Architectures: System on Chip Interconnect", 2008.

Giovanni De Micheli et al., "Networks on Chips: Technology and Tools", 2006.

Michael Bedford Taylor et al., "Evaluation of the Raw Microprocessor An Exposed-Wire-Delay Architecture for ILP and Streams", Proceedings of the 31st Annual International Symposium on Computer Architecture, 2004, pp. 2-13.

Michael Butts et al., "A Structural Object Programming Model, Architecture, Chip and Tools for Reconfigurable Computing", 2007 International Symposium on Field-Programmable Custom Computing Machines, 2007, pp. 55-64.

Dmitrij Kissler et al., "A Dynamically Reconfigurable Weakly Programmable Processor Array Architecture Template", International Workshop on Reconfigurable Communication Centric System-on-Chips (ReCoSoC), 2006, pp. 31-37.

Mitsuru Hiraki et al., "Stage-Skip Pipeline: A Low Power Processor Architecture Using a Decoded Instruction Buffer", 1996, pp. 353-358.

Murali Jayapala et al., "Clustered Lo Buffer Organization for Low Energy Embedded Processors".

Tom Vander AA et al., "Impact of ILP-improving Code Transformations on Loop Buffer Energy", pp. 1-8.

Gregory M. Papadopoulos et al., "Monsoon: A Dataflow Computing Architecture Suitable for Intelligent Control", IEEE, 1990, pp. 292-297.

Makoto Amamiya et al., "DFM: The Data Flow Machine for Highly Parallel Symbol manipulation", IEEE, 1987, pp. 602-611.

Yale N. Pati et al., HPS, a New Microarchituecture: Rationale and Introduction, Proceedings of the 18th Annual Workshop on Microprogramming, 1985, pp. 103-108.

Yale N. Patt et al., Critical Issues Regarding HPS, a High Performance Microarchitecture, Proceedings of the 18th Annual Workshop on Microprogramming, 1985, pp. 109-116.

Shlomo Weiss et al., "Instruction Issue Logic for Pipelined Supercomputers", ACM SIGARCH Computer Architecture News, 1984, pp. 110-118, vol. 12, No. 3.

James E. Smith et al., "The Microarchitecture of Superscalar Processors", Proceedings of the IEEE, 1995, pp. 1609-1624, vol. 83, No. 12.

R.M. Tomasulo, "An Efficient Algorithm for Exploiting Multiple Arithmetic Units", IBM Journal, 1967, pp. 25-33, vol. 11, No. 1.

R.E. Kessler et al., "The Alpha 21264 Microprocessor Architecture", IEEE Micro, 1999, pp. 24-36, vol. 19, No. 2.

Scott McFarling, "Combining Branch Predictors", Rechnical Report TN-36, 1993.

James E. Smith et al., "Implementation of Precise Interrupts in Pipelined Processors", IEEE Transactions on Computers, 1988, pp. 562-573, vol. 37, No. 5.

Steven Swanson et al. "WaveScalar", Proceedings of the 36th International Symposium on Microarchitecture (MICRO), 2003.

Steven Swanson et al., "The WaveScalar Architecture", ACM Transactions on Computer Systems (TOCS), 2007, pp. 1-35, vol. 25, No. 2.

Krishna M. Kavi et al., "Scheduled Dataflow: Execution Paradigm, Architecture, and Performance Evaluation", IEEE Transactions on Computers, 2001, pp. 834-846, vol. 50, No. 8.

Karthikeyan Sankaralingam et al., "Exploiting ILP, TLP, and DLP with the Polymorphous TRIPS Architecture", Proceedings of the 30th Annual International Symposium on Computer Architecture, 2003, pp. 1-12.

Mark Homewood et al., "The IMS T800 Transputer", IEEE Micro, 1987, pp. 10-26, vol. 7, No. 5.

Andrew Duller et al., "Parallel Processing—the picoChip way!", Communicating Process Architectures, 2003, pp. 125-138.

Zhiyi Yu et al., "AsAP: An Asynchronous Array of Simple Processors", IEEE Journal of Solid-State Circuits, 2008, pp. 695-705, vol. 43, No. 3.

Paul Chen et al., "Multi-mode sensor processing on a dynamically reconfigurable Massively Parallel Processor Array", Proc. of SPIE, 2008, pp. 1-9, vol. 6968.

Csaba Andras Moritz et al., "Exploring Optimal Cost-Performance Designs for Raw Microprocessors", IEEE Symposium on Proceedings in FPGAs for custom Computing Machines, 1998, pp. 12-27.

Henk Corporaal et al., "MOVE: A framework for high-performance processor design", Proceedings of the 1991 ACM/IEEE Conference on Supercomputing, 1991, pp. 692-701.

Henk Corporaal et al., "Using Transport Triggered Architectures for Embedded Processor Design", pp. 1-25.

Jeroen A.J. Leijten et al., "Stream Communications between Real-Time Tasks in a High-Performance Multiprocessor".

Kees Goossens et al., "Aethereal Network on Chip: Concepts, Architectures, and Implementations", IEEE Design & Test of Computers, 2005, pp. 414-421, vol. 22, No. 5.

Wen mei W. Hwu et al., "The Superblock: An Effective Technique for VLIW and Suprescalar Compilation", Journal of Supercomputings, 1993, pp. 1-24, vol. &, No. 1.

Jack B. Dennis et al., "A Preliminary Architecture for a Basic Data-Flow Processor", ACM SIGARCH Computer Architecture News, 1974, pp. 126-132, vol. 3, No. 4.

A.L. Davis, "The Architecture and System Method of DDM1: A Recursively Structured Data Driven Machine", Proceedings of the 5th Annual Symposium on Computer Architecture, 1978, pp. 210-215.

Masasuke Kishi et al., "DDDP: A Distributed Data Driven Processor", Proceedings of the 10th Annual International Symposium on Computer Architecture, 1983, pp. 236-242.

* cited by examiner

TILE-BASED PROCESSOR ARCHITECTURE MODEL FOR HIGH-EFFICIENCY EMBEDDED HOMOGENEOUS MULTICORE PLATFORMS

BACKGROUND OF THE INVENTION

Embedded systems are computer systems part of larger systems dedicated to execute several specific functions generally under real-time constraints. They are used for control as well as for data or signal processing. They are present in many application fields that are among others: telecommunications, automotive, industrial control, power conversion, military, avionics, aerospace, household appliance and consumer electronics. Examples of embedded systems are cell phone handsets and base stations, on board radars, network routers, modems, software-defined radio communication terminals, engine controllers, satellite flight computers, GPS positioning terminals, set-top boxes or digital cameras. Embedded systems are generally highly constrained due to their operating environment or reliability requirements. Engine control, oil drilling or military applications can have severe temperature requirements while avionics and aerospace are exposed to radiations. Cell phone handsets are constrained by battery autonomy and their base stations by cooling.

Embedded applications are part of products offering functionalities to end-users. Those functionalities are generally defined by roadmaps driving the market demand by providing more functionalities or increased throughput at each new product generation. This functionality enhancement at each new generation leads to more complex programs to be executed on embedded platforms but also to a wide variety of programs to be supported on a single platform. New standards require higher data throughput meaning more computation capabilities, they also use advanced algorithms to be able to reach higher throughput requirements. An example is the telecommunication standards evolution using simple phase shift keying waveforms for low data rate transmission to the far more complex multiple-input multiple-output orthogonal frequency-division multiplexing with adaptive channel capability for the highest throughput. The advanced application and algorithm support causes computation to be more complex. Indeed, with simple image and signal processing applications implemented in early standards, barely all the computation load is executed in small kernels having few instructions but a very high iteration count and very simple control paths. Those simple kernel-oriented algorithms allow to easily exploit a high-level of parallelism and are easy to implement in dedicated hardware accelerators. With new advanced and complex standards, the control part became important leading to important parts of sequential code difficult to parallelize. Furthermore, complex control paths can even be present inside high computational kernels making them difficult to implement using dedicated hardware. Another major shift is toward software-defined applications where standards are not fully defined by hardware implementations but are composed dynamically using software. The most advanced one is software-defined radio that copes with the large number of telecommunication standards. It aims to provide a standard software interface called by the application allowing to compose services dynamically to realize custom functions.

In summary, supporting future embedded applications requires to support more complex functionalities with higher computational throughput. It also requires high programmability capability to support advanced functions and sophisticated algorithms up to fully software-defined applications, all this under real-time constraints.

Embedded platforms dedicated to host embedded systems, are constraints by their environment. They are not limited by the computing capability of silicon chips since a one square centimeter silicon surface can already contain a desktop multicore processor. Embedded systems are severely constrained by their total power consumption. Indeed, most of them are battery powered with limited battery capacity and poor improvements at each new product generation. For systems that are not battery powered, heating caused by the system power consumption leads to cooling issues difficult to handle in integrated environments. It is for example the case with cell phone base stations that have to handle thousands of communications at the same time requiring a very intensive computation load while being integrated close to the antennas. In high temperature environments like for engine control in automotive applications the cooling capability is further limited. Due to those issues, power consumption is the main constraint that future embedded computing platform have to deal with.

Silicon technology used for embedded platforms implementation has also to face limitations. With technology shrink, the number of transistors doubles every new technology node about every 18 month to two years. A problem is that together with transistor shrink, there are only a limited transistor scaling regarding their power consumption. It can be easily observed in high-end FPGA platforms offering double gate resources at each new generation with no substantial reduction in transistor power consumption, even if they operate at a same frequency, causing an overall increase in power consumption of components that dramatically limits their usage. This poor transistor power reduction is even worse in deep sub-micron technology nodes below 65 nm. After this node, one cannot count on technology scaling anymore to solve the power consumption increase due to platform enhancements. Moreover, deep sub-micron technology nodes raise further limitations for their usage as an easy gate count provider, as it was the case during previous decades. Those limitations are process variations and leakages. Process variations are due to manufacturing hazards, leading to important electrical characteristics variations of transistors over a single component. At platform-level, this causes a single wide synchronous design spanned over an entire chip to operate at a very low conservative frequency. Leakages increase transistor power consumption, even if they are not used. They impose to use a high threshold voltage (Vth), especially in power-constrained embedded applications. Power supply voltage (Vdd) is also reduced as much as possible in order to reduce the dynamic power consumption that is proportional to Vdd square. This reduction of Vdd while maintaining a high Vth that strongly mitigates operating frequency increase with new technology nodes. Indeed, for embedded processes one assists to barely no frequency improvements since the 90 nm node.

Applications require higher computation throughput with a high-level of programmability while the technology still provides higher transistor count but without significantly reducing their power consumption. It obviously does not match the embedded constraints of reducing the total power consumption due to a limited power budget. The impacts of those conflicting constraints on future embedded processing platforms leads to the following requirements:

High programmability to support complex algorithms with complex control paths and software-defined applications High level of parallelism to support the high computation needs with a limited operating frequency High power efficiency in terms of operations per watt, to support high computation load in a limited power budget while using the future technology nodes.

Existing Approaches

The main approach used today to fulfill embedded platform requirements is heterogeneous multicore. Here cores are processing resources that can be GPP (general purpose processor) digital signal processors and dedicated accelerators. Multicore is used to increase overall parallelism execution since limited frequency does not allow to support complete applications using a single processor core even with coprocessor support. Heterogeneity comes by the use of domain specific accelerators to improve power efficiency. A platform is always build around a GPP surrounded by accelerators connected by a bus. Accelerators are mostly dedicated hardware implementations of defined functions or have limited configurability within a specific algorithm domain.

There are four major issues raised by this approach limiting its use for future embedded computing platforms. The first is that there are many domains and even many standards within domains leading to a very high dedicated accelerator count [REF]. Different accelerators can even be used within a single domain depending on throughput and real-time constraint. The second issue with heterogeneous multicores is that they are complex platforms that are designed for a precise set of applications. It is therefore difficult to efficiently port new applications on existent platforms especially for more advanced standards. This leads to frequent redesign with functionality set modification like it is the case for example with cell phone handset platforms. The third issue is with silicon area that increases with the accelerator count. Heterogeneous multicores have a poor silicon utilization since few of them are really used at the same time. The fourth and last issue is raised when programming those heterogeneous platforms. Since they group heterogeneous components they require costly manual intervention to partition applications over the available resources. Moreover, this partitioning is platform dependent and needs to be very accurate to take benefit of all the resource capabilities without incurring the prohibitive cost of executing a task on an inappropriate resource. This causes that when the platform changes, the partitioning needs to be done again starting at application-level to the low assembly-level. Platform dependent partitioning causes therefore reusability issues and cost overhead.

Together with heterogeneous multicores, other low-power techniques are used. The most import one from an architectural point of view is the island-based Vdd scaling. With this approach, a chip is partitioned into islands that can operate at different Vdd and speed, to further minimize power consumption. The Vdd is dynamically adjusted depending on the real-time constraint of each island. Variable speed in each tile introduces latency issues in the inter-island communication network. In order to be latency tolerant, the different tiles of the chip are connected through FIFO (first in, first out) communication links supporting mesochronous clock synchronization. Island-based approach is foreseen as a main architectural solution to cope with process variations in large chip.

The current heterogeneous multicore approach is very difficult to follow with the fast growing of standards requirements and services. Even cell phone handset platforms that are today implemented using heterogeneous multicore solutions have to face those limitations, even if those handsets benefit of very high production volumes allowing to amortize design costs. Other markets not driven by very high volumes as it is the case in professional electronics applications cannot take this approach due to prohibitive silicon, design and programming costs. For those reasons important researches and improvements are made on the accelerators to make them more flexible by improving their programmability while keeping them low power.

A mature solution for improving accelerators flexibility is the SIMD (single instruction, multiple data) vector processor architecture. It is already used for a while as multimedia accelerator in desktop processing and it is used today in real embedded platform products for video and baseband processing. SIMD offers a good compromise between programmability and power efficiency. It allows to implement a wide variety of standard with a single accelerator. Nevertheless, it is very difficult to program since algorithms need to be vectorized and compiler support is either experimental or is limited to very specific language constructs. Furthermore, it does not support at all sequential code. For that reason it is always used in association with a GPP or a VLIW leading to an heterogeneous accelerator. It needs to be manually and very accurately programmed to obtain expected performances. When applications became more complex, the difficulty of vectorization limits performances and the power efficiency of this solution.

A more advanced research approach to make power efficient and programmable accelerators is coarse grain reconfigurable processing arrays. They allow to implement custom datapaths that are configured at runtime. Configuration can even be rewritten at each clock cycle depending on the configuration controller and configuration memory capacity. They have limited branch support that are achieved in the configuration controller or by using predicated execution. It is therefore not possible to execute sequential code or kernels with complex control paths on those accelerators. As for the SIMD architecture, control and sequential parts of the code are executed on an heterogeneous GPP or a VLIW next to the accelerator. They have barely no compiler support requiring tedious manual programming. They have a limited kernel size support when using a single configuration or they have to face an important power consumption overhead in continual configuration memory loading. The power consumption of the configurable interconnection fabric is high due to the reconfigurability capability overhead. Furthermore, reconfigurable interconnection fabric introduces latencies due to wire length and their high fanout that cannot be easily pipelined. Their operating frequency is therefore not very high.

The last main solution to heterogeneous multicore platforms issues is the homogeneous multicore approach. It is the approach used in this work. Homogeneous multicores are made of an array of highly programmable processor cores like optimized scalar RISC, DSP or VLIW processors. The processors in the array are connected together through a dedicated programmable or reconfigurable communication network. They benefit of a good compiler support, allowing to port applications with very few manual intervention compared with the other approaches. Their uniform ISA (instruction set architecture) does not require precise partitioning. They can execute sequential code and support kernels with complex control paths. Thanks to their scalable communication network they can exploit a very high level of parallelism that can reach hundreds of cores for some platforms. Nevertheless, beside their very good programmability and scalability they are limited in power efficiency due to their use of fully programmable processor cores. When homogeneous multicores are build with simple scalar RISC cores to be low power, they cannot exploit ILP in the sequential parts. Indeed, they have to use communication network for inter-core communication that has inefficiencies for ILP limiting their performances when executing sequential part of the applications. Their power efficiency is also lessen by the inter-core communication network overhead.

As a conclusion, homogeneous multicore approach solves many issues raised by heterogeneous multicores. A same computing fabric is used for all the application domains. The platform design is simple and generic and is reused for many applications. All the cores can be used whatever the application, leading to a good silicon surface utilization. They are easily programmable and benefit of a good compiler and tool support requiring very few manual intervention. Regarding processing platform constraints raised by the future embedded systems, they have a very high programming capability, their scalability allows to exploit a very high level of parallelism and their relative simplicity allow to easily bound their WCET (worst case execution time) needed to guarantee quality of services in real-time constraints. Nevertheless, their use of fully programmable processor cores and inefficient communication network leads to a low power efficiency which is a major drawback for their use in embedded platforms.

When solving the current heterogeneous multicore platform limitations by using the homogeneous multicore approach, the problem that needs to be addressed is to have a fully programmable processor core that can exploit ILP with a very high power efficiency and efficient inter-core communication support.

Related Works: Dataflow Architectures

Dataflow architectures are studied and used for several decades [78, 79, 80, 81, 82]. The first known implementation as a complete processor core has been achieved by Dennis in the early seventies [78]. Dataflow architectures are used to exploit fine-grain instruction-level parallelism and obtain a high level of parallelism during execution. Some architectures even use dataflow to automatically extract parallelism out of a sequential thread of code.

In the general dataflow model, data manipulated are decorated with a tag to form tokens. By this, data can be atomically manipulated and distinguished between each other without using a central controller. Instructions consume data token as operands and produce tokens as results. They are executed asynchronously on independent processing elements (PE) following the dataflow firing rule. This rule is that an instruction can be executed when all its operands are available. After being produced, data tokens are stored and wait until they are consumed by instructions.

There are two main architectural models implementing the dataflow execution model. The first makes dynamic tag comparisons in content addressed memories to match produced data with their consumer instructions. The second model uses explicit token communications in register tables. Registers are associated with instructions and are accessed by indexes. Most of the other dataflow architectures can be derived from those two models that are detailed in the following.

The first dataflow architectural model is used in superscalar processors [83, 84, 85, 86] described in HPS [83] and by Weiss and Smith [85]. Superscalar uses the Tomasulo scheduling [87] introduced in the 60' in IBM computers. It was used to hide floating point units execution latencies by executing in parallel selected instructions ahead in the sequential execution flow of the program, while the current instruction is executed. Superscalar uses queues of instructions waiting to be executed on their dedicated unit. When a data is produced by a PE, its data decorated with its tag is broadcasted in all instruction queues by means of the common data bus. If the tag matches an instruction operand tag in a queue, the data is copied in the operand place. When an instruction has all its operands ready, it can be executed on its PE. The oldest instructions in queues have an higher priority. A variant scheme uses a separate data register file and only the tags are stored in instruction queues in order to reduce their complexity. This latter approach requires an extra pipeline stage. It is used for example in the alpha 21264 processor [88].

This dataflow model has two important particularities regarding the dataflow model presented in this work. The first is that a produced token needs to be presented to all entries of all queues in order to ensure to match all potential consumers. The common data bus is therefore made of long wires having a high fanout leading to important power consumption. The second particularity is that once instructions are in queues, branches can only be supported by using predicates that nullify instructions belonging to the wrong path. Moreover using predicates has the disadvantage to load instructions of both paths following a conditional branch. Instructions in queues are meant to be executed as part of a continuous sequential flow. The branches are therefore weakly supported by this dataflow execution engine. In order to mitigate this issue, this model uses a branch predictor [89] together with a state recovery mechanism in case of misprediction [90]. The branch predictor provides a single path instruction flow to the dataflow engine.

The Wavescalar architecture [91, 92] uses this dataflow model with tags and instruction queues to exploit instruction-level parallelism. They propose a hierarchical architecture where computation is distributed and executed directly in caches called WaveCaches. Unlike in superscalar, the architecture does not execute sequential programs but uses a dedicated ISA to directly execute dataflow code. They load blocks of dataflow instructions called Waves in queues associated with PEs. Branches are achieved by predicates but also between Waves loading. Wavescalar has the advantage to exploit a very high level of parallelism. The dedicated dataflow ISA strongly reduces its complexity compared to superscalar. Nevertheless, token broadcasting and tag comparisons still need to be done in all queues which is highly power consuming and lessens its power efficiency.

The second main dataflow architectural model has been published as scheduled dataflow [93] and in TRIPS [94]. It does not use instruction queues but operands registers reserved by instructions in tables that are addressed by indexes. Producer instructions write their results explicitly in operand registers of consumer instructions. For this, two destination addresses are recorded in producer instructions, corresponding to the consumer address registers in tables. When a data is used more than two times, a copy operation needs to be issued. Instructions having their operands ready can be selected to be executed on their PE. A pipeline cycle is dedicated to instruction selection. TRIPS implements this model with a set of tables associated with their PE, a set of register files and data memory banks. Instruction tables of all PE are visible through an operand NoC and are part of a same address space. This distributed address space allows instructions to communicate between each others even if they belong to different PE. The architecture has several memory ports with load/store queues and supports multithreading. It targets to support instruction-level, memory-level and thread-level parallelism to be a polymorphous execution platform with a very high level of parallelism. A drawback is the NoC latency that penalizes data communication of instructions belonging to different PE. The use of separate operands table, the NoC and separate register files reduce the power efficiency of this architecture.

The dataflow execution model presented in this work does not uses tags nor indexes. Instead of having instruction queues or tables associated with PE, the dataflow engine has only one instruction slot per PE. Program execution is achieved by first selecting instructions from a sequential sub-thread and then by executing them one by one in the dataflow engine. An instruction is taken from its local sequential flow and presented to the dataflow engine to be the next to be executed on its PE. Since dynamic selection only follows a sequential flow, an instruction scheduling is done statically in order to form local sequential sub-threads based on data dependencies and resources availability. Even if instructions are executed in dataflow, their execution order in a tile is determined during compilation. This removes the need of large tables or queues by making it possible to use only one instruction slot per PE. Nevertheless, the out-of-order execution capability of this model is very limited and cannot be used to automatically hide execution unit latencies without compiler support.

The dataflow engine itself is made of fixed point-to-point DFLs. Instructions select dataflow links to take their operands from, and send their results. The dataflow engine has a minimal complexity to achieve communications between PEs. It does not need queues with content accessed memories nor indexed tables with operands networks. This allows to reduce latencies to their minimum corresponding to the wires latencies between PEs. Furthermore, this allows to obtain a higher power efficiency since it reduces switching activity and wire capacitance. Instructions selection in sub-threads is like executing a local sequential flow which support branches. Flags used by conditional branches are directly provided by the dataflow engine to the local sub-thread controller. This is done the same way than data are communicated between PE. Sequential controllers of tiles belonging to a cluster are part of a same control domain allowing a cluster to execute any control path like in classical RISC machines. This therefore mitigates branch handling issues encountered in the other dataflow models.

Homogeneous Architectures for Embedded Systems

Homogeneous architectures are good candidates to cope with challenges raised in future embedded systems. In addition to their relative simplicity, numerous architectures have already been proposed. An early contribution in homogeneous parallel machines is the Transputer [95]. It has been proposed in the early 80' as a single processor chip with inter-core logic intended to be used to build highly parallel multiprocessor systems. It uses serial point-to-point connections between neighboring processors using a mesh topology. Inter-core communications were achieved by issuing dedicated move instructions.

More recently, numerous homogeneous platforms were proposed specifically for embedded systems, requiring a massively parallel execution for very computational intensive workload. Those platforms are called MPPA for massively parallel processor arrays. Their goal is to offer as much parallelism as possible on a single chip, reaching several hundreds of cores. They are made of simple RISC core with their local memories connected by a dedicated communication network. Almost all those architectures use FIFOs as communication primitives. They allow to communicate and synchronize execution on separate cores with moderate overhead, without using a central controller which is impracticable in massively parallel platforms. The main contributions in MPPA are presented here.

PicoArray processors from picoChip propose wide multi-cores up to 300 cores on a single chip [96]. Each core is 16-bit 3-issue VLIW. They are connected by a bus using time division multiplexing implemented by programmable switches. The weakly programmable processor array (WPPA) is a research platform [67]. It uses a reconfigurable network using FIFOs. The AsAP architecture [97] uses the same reconfigurable communication model but has the particularity to locally modify voltage and frequency depending on the workload, in order to further reduce power consumption. They take benefit of FIFO based communications that allows to easily cope with retiming issues raised by multiple clock domains.

Ambric proposes a multicore made of hundreds of cores connected by dataflow reconfigurable network [98, 35, 66]. They use communication links similar to small two-register FIFOs called CHANNELS. The difference with FIFOs is that they embed in the links special control logic able to manage data production and consumption of connected CHANNELS without having to implement a separate control process like with FIFOs. They have also the particularity to allow instructions to be streamed and duplicated using the data CHANNELS to control several distant cores from a same instruction source.

Finally, the Tilera processor cores [99] implementing the RAW architecture [37, 64, 100] is made of 64 3-issues VLIW cores. Inter-core communications are handled in two ways. The first is a network using programmable routers able to implement time division multiplexing. The second inter-core communications capability is achieved by FIFOs connecting neighboring cores. FIFOs are accessed in the register file through register indexes.

The difference between those MPPA platforms and the proposed architecture is that even if they use FIFOs, they are connected between cores and are not used inside a parallel core to communicate data. The use of FIFOs between cores introduces latencies. FIFOs are connected between neighbors in mesh topology or require to dynamically reconfigure a network. When the network is properly configured, the minimum latency between cores is one cycle. But in this latter case communications are fixed and programmability is lost. Those architectures cannot exploit fine-grain parallelism spanned over several cores, while the proposed architecture can exploit fine-grain parallelism between tiles inside a cluster. Moreover, since those multicore architectures are made of separate cores, they all belong to different control domains. This means that a flag produced in one core by a comparison instruction cannot trigger conditional branch execution in other cores. They have to communicate the flag as a full data word through the reconfigurable network to register locations of other cores before using it for a branch. All this takes several cycles. Moreover, if several cores need to branch, copy instructions have to be issued. The proposed architecture allows to branch in a tile the very next cycle a comparison instruction has been executed on any other tile of a cluster.

Due to those limitations, MPPA are mainly used to execute streaming applications without complex control requirements. Indeed, an important change in computation layout requires a costly reconfiguration process. They are therefore well suited for applications that can take benefit of spatial computation on the array and where application phases are executed during a relatively long period. Regarding power consumption, a high number of cores increases throughput but does not increase the overall power efficiency of the platform. The big MPPA components cited before consume on average around 10 Watts, which is relatively high for highly constrained embedded systems.

Another main difference with MPPA is that LiteFlow does not use local register files accessed by indexes in instructions. The reason is that its reading to fetch operands introduces an extra pipeline stage. This increases the conditional branch delay penalty causing speedup drawbacks. It is an important issue in widely parallel spatial computation where the number of instructions in loops reaches one. Mitigating branch delay by unrolling causes an important increase of kernel sizes that limits the use of local instruction buffers. Those issues are detailed in the following chapter.

Register values can always be read, which is not the case with dataflow, and if a data is used by several consumers it has to be duplicated in some way. Using a local register file causes instructions to manipulate data by indexes. It is therefore not suitable to mix local register file-based computation with dataflow. Indeed, with register indexes, it is not possible to choose to consume a value or not, as in LiteFlow. The result of a register-based ISA is written in one or sometimes two registers, requiring to duplicate data. In LiteFlow, bits are used to select destination DFLs. This allows to broadcast data to all potential consumers, without issuing duplication instructions.

Dedicated Accelerator Architectures

Dedicated architectures have proposed to increase parallelism and power efficiency of computational tasks in embedded systems. The transport-triggered architecture (TTA) implemented in the MOVE framework make only explicit data communications to computation resources [101, 102]. Here the data transport to the inputs of execution triggers a particular operation execution. The architecture uses a communication bus connected to functional units by means of sockets. Long instructions specify explicitly communications between sockets that trigger parallel execution of operations.

Dedicated architectures for communications in multicore platforms have been proposed. The CPA model (co-processor array) is made of processing elements connected to a programmable network by means of FIFOs [103]. Here PEs can be processor cores or custom heterogeneous accelerators. An enhanced version of NoC has been proposed with Aethereal [104] that puts emphasis on quality of services which is a key issue in embedded hard real-time applications.

The ADRES platform is made of an accelerator strongly coupled with a VLIW [31]. The accelerator is a coarse-grain reconfigurable array (CGRA) introduced in the MORPHO-SYS architecture [32]. The VLIW is used for the control intensive part of applications and kernels are accelerated in the CGRA. It is made of interconnected PEs having a local register file. It is completely synchronous and does not use dataflow. The entire CGRA is controlled synchronously by a configuration vector loaded at each cycle from the configuration memory. Branches are achieved by using predicates.

Finally, two main contributions in coarse-grain reconfigurable platforms are Montium [34] and PACT-XPP [33]. They target very high power efficiency for intensive embedded computational platforms. Montium is made of simple PEs that are ALUs and memory blocks interconnected by a programmable crossbar. The configuration vector is loaded at each cycle and its controller allows to branch in configuration memory. The XPP architecture is made of ALUs and small memories connected between each others by a reconfigurable dataflow network. Those two architectures target kernel acceleration for streaming applications.

SUMMARY OF THE INVENTION

The present invention relates to a processor which comprises processing elements that execute instructions in parallel and are connected together with point-to-point communication links called data communication links (DCL).

The invention relates also to a two-level code organization.

The instructions use DCLs to communicate data between them. In order to realize those communications, they specify the DCLs from which they take their operands, and the DCLs to which they write their results. The DCLs allow the instructions to synchronize their executions and to explicitly manage the data they manipulate. Communications are explicit and are used to realize the storage of temporary variables, which is decoupled from the storage of long-living variables.

In particular, the present invention relates to a processor with its execution model. The processor is comprised of processing elements which execute instructions, data communication links, and instruction memories.

DCLs are point-to-point communication links that can also provide data storage capability. A DCL has one write port and one read port, and provides information about the availability of those ports. Data reads from the read port are done in a predefined order in relation with the sequential order of data writes in the write port. Beside data reads and writes, DCLs provide additional operations that enable explicit management of the stored data. Those operations are: read without data consumption, forced write with data replacement, and link storage flush which erases all stored data. Availability information allows to realize synchronization using DCLs, and data management operations allow to perform explicit management of the data stored in the DCLs.

The DCLs are the only communication means between processing elements. They also provide temporary storage for the computation results of the processing elements. Processing elements are grouped in tiles. The processing elements of a tile share a set of DCL read ports connected to the tile inputs, and another set of DCL write ports connected to the tile outputs. The tiles are therefore connected between them by DCLs, and some DCLs can provide links between the outputs and the inputs of the same tile.

The particularity of the invention is that instructions which are executed on the processing elements take their operands only from DCL read ports connected to the tile inputs. Moreover, the instructions only write their results in one or more DCL write ports connected to the tile outputs. As instructions only specify point-to-point communication links, data communications between the processing elements are explicit and fully determined. Communications do not have to be interpreted and resolved by the microarchitecture. As DCLs also provide synchronization means, instructions can synchronize their execution between them only by using explicit communications, even if they are executing on different tiles. Also, as DCLs allow to manage their data explicitly, instructions have a complete control on the data stored in the DCLs of a tile.

The execution of the instructions on the tile processing elements is performed by following a predefined order defined in the instruction. As the tile processing elements share a same set of DCLs, this priority order allows to specify an access sequence to the DCLs used by the instructions belonging to the same bundle.

A set of tiles controlled by the same instruction bundle is called a cluster, and is associated with an instruction memory. In a cluster, one processing element is a branch unit which possesses an address register and provides the address of the next instruction bundle to read from the cluster instruction memory.

A set of clusters constitutes a processor. Each cluster executes an thread of instructions stored in its instruction memory. Instructions executed on processing elements belonging to different clusters can be synchronized and share data directly using DCLs, without requiring the intervention of the microarchitecture, or requiring complex routing resources.

Communications are decoupled from variable storage. DCLs provide storage which is limited to temporary results, whereas long-living variables are stored using local memories implemented in the processing elements.

As communications are specified explicitly, provide synchronization means and allow to manage data, the described processor has a strongly simplified microarchitecture compared to other parallel processors. Indeed, it is not necessary to have a complex bypass circuit, a multiported register file, a pipeline to perform data updates or even complex routing resources like in other parallel processors. This processor allows therefore to reduce the implementation complexity, to have a higher scalability and power efficiency while exploiting instruction-level parallelism and synchronizing the execution.

These and other features, aspects, and advantages of the present invention will become better understood with reference to the following description and claims.

DETAILED DESCRIPTION OF THE INVENTION

The present invention relates to a processor with its execution model. The processor comprises processing elements which execute instructions, data communication links, and instruction memories.

Figure 1:
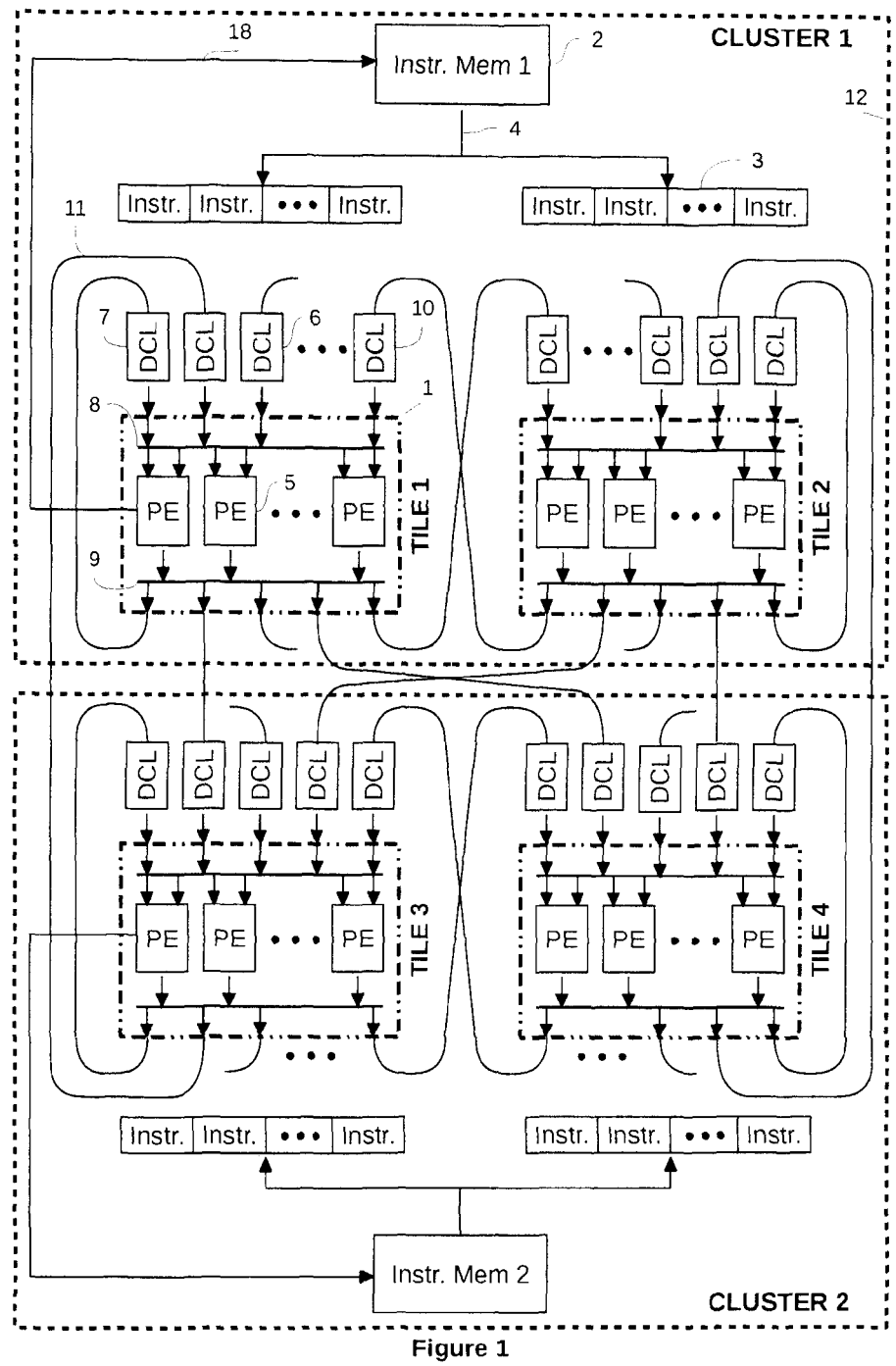
FIG. 1: Processor embodiment of the invention. It has two clusters, each comprising two tiles.

A general view of an embodiment of the processor is given in FIG. 1. It is made of clusters, and one cluster comprises one or several tiles FIG. 1.1, an instruction memory FIG. 1.2 and an a register FIG. 1.3 to store an instruction bundle for each tile. Long instruction bundles are fetched at once from the instruction memory FIG. 1.4 and is split to be written into their own tile.

A tile groups several processing elements (PE) FIG. 1.5. Each PE executes its own instruction from the instruction bundle of its tile. All data communications between PE and between tiles are achieved by means of data communication links (DCL) FIG. 1.6. For this, instructions directly read and write data into DCL as operand without using register files and shared register indexes.

Data Communication Links

DCLs are point-to-point communication links that can also provide data storage capability. A DCL has one write port and one read port. DCLs provides information about the availability of those ports. More precisely, the DCL indicates if the read port can be accessed for reading a data, meaning that there is actually a data into it. It also indicates if the write port can be accessed for writing a data into it, meaning that it is possible to write a data into it. Data reads from the read port are done in a predefined order depending on the sequential order of data writes in the write port. In its simplest version, data are read in the same order that they are written into the write port.

Beside data reads and writes, DCLs provide additional operations that enable explicit management of the stored data. Those operations are: read without data consumption, forced write with data replacement, and link storage flush which erases all stored data.

Therefore, when a data is read from the output port of a DCL, it can be removed from the DCL or not. In the latter case, the data can be reused directly from output port without requiring a to execute a copy operation as it is the case in a FIFO-like semantic.

A forced write allows to override stored data without caring if it has been read or not. It is useful for example for routines dealing with interruption. In the same way, data link flush allows to recover from a software exception. Indeed, as an exception is random by definition, when it occurs it is therefore not possible to know precisely if a given DCL as a data into it or not. The flush operation allows to thrash a possibly corrupted or meaningless computation state to go to a defined state. When using simple FIFOs, it is not possible to go from an undefined state to a defined state without issuing a reset. Indeed, a read operation on an unknown empty FIFO will hang execution resulting in a blocked computation. Finally, a test instruction allows just to test if a data has been send through a DCL and can be used for example to trigger an I/O processing routine.

Availability information allows to realize synchronization using DCLs. Indeed, when an instruction has to write a data into a input port of a DCL, it has to wait until the port is available. Its execution will be therefore synchronized on the data consumption by another instruction from the reading port of the DCL. Conversely, when a data is used by an instruction from the read port, it will have to wait its availability and possibly for another instruction to write a data in the DCL.

Data management operations allow to perform explicit management of the data stored in the DCLs because they allow to explicitly consume or not a data. This allows to use a data several times without having to issue copy operations or to copy a data into a local or shared register. Another explicit data management preventing costly copy operations is the ability for an instruction to write its data result in multiple output DCL of a tile as it will be explained in the following.

Tiles

Tiles are made of processing elements sharing a same set of read ports of input DCLs FIG. 1.8. They also share a same write port set of output DCLs FIG. 1.9. The DCLs are the only communication means between processing elements. They also provide temporary storage for the computation results of the processing elements. One or several DCLs from the output set of a tile are connected to the same tile providing local data storage FIG. 1.7. A PE in a tile that produces a result that has to be reuse in the next instruction writes it results in a local DCL and can reuse it during the next instruction. Other DCL are connected to tiles belonging to the same cluster FIG. 1.10 or to tiles belonging to different clusters FIG. 1.11. In all case, DCLs allow to communicate directly between PE and hence between consecutive instructions even if they belong to different clusters.

Instruction Operands and Execution

The particularity of the invention is that instructions which are executed on the processing elements take their operands only from DCL read ports connected to the tile inputs. Moreover, the instructions only write their results in one or more DCL write ports connected to the tile outputs. For this, the instruction specifies the DCL indexes in the local incoming set to take its data. Extra information in the instruction specify if the data has to be removed out of the DCLs or kept for a future usage. The instruction specifies also one or several DCLs in the outgoing set to write the result data.

As instructions only specify point-to-point communication links, data communications between the processing elements are explicit and fully determined. Communications do not have to be interpreted and resolved by the microarchitecture. As DCLs also provide synchronization means, instructions can synchronize their execution between them only by using explicit communications, even if they are executing on different tiles. Once a DCL is used by an instruction, it is possible to know what is the instruction at the opposite side of the DCL that will read or has written the data. Also, as DCLs allow to manage their data explicitly, instructions have a complete control on the data stored in the DCLs of a tile and do not require to copy data for multiple use.

Instructions are executed if their data are available in the input DCL specified by the instruction and if the destination DCLs specified by the instruction are available for writing. Then the instruction can be executed. All instructions belonging to a same instruction bundle do not have to be executed at the same time and since DCLs are used for data communications, it is even possible to pack a set of dependent instructions into a same bundle. Instructions will just execute one after another, waiting for their operands send and received through determined DCL. This is a totally different approach than in VLIW where the long instruction word is executed at once. It has the advantage to strongly reduce the use of empty instruction slots that are common in VLIW code when there are not enough parallelism available. This reduces the program size and the power consumption due to empty memory accesses.

A set of tiles controlled by the same instruction bundle is called a cluster FIG. 1.12, and is associated with an instruction memory. In a cluster, one processing element is a branch unit which possesses an address register and provides the address of the next instruction bundle to read from the cluster instruction memory.

Once all instructions in an instruction bundle are about to complete their execution, the next bundle in fetched and latched in the instruction bundle register of each tile in the cluster. Moreover, instructions from a same bundle executed on a same tile can share the same DCL as operand. For this, the execution of the instructions on the tile processing elements is performed by following a predefined order defined in the instruction. As the tile processing elements share a same set of DCLs, this priority order allows to specify an access sequence to the DCLs used by the instructions belonging to the same bundle. And even if two instructions access a same DCL port, the priority order determine which instruction access it first, resolving the conflict.

Instructions specify communications and not shared memory locations like registers in von Neumann VLIW architectures. DCLs are used to store temporary data produced and used between instructions. Once an instruction produces a data, it can be immediately used by another instruction without the intervention of the microarchitecture which means that it can be used the very next cycle. DCLs are therefore used mostly for short-living variables. Long-living variables can be handled in two ways. The first is to let the data in an output port of a DCL. It is very useful for successive reuse. Another way is that some PE are small local storage arrays that are used for storing variable. They must be explicitly saved and restored in the array by a dedicated instruction. Again this is not handled automatically by the microarchitecture and by register indexes like in register machines. Nevertheless, the advantage of this approach is that the communications are decoupled of variable storage.

Since communication sets of DCL are local to a tile but provide access to other tiles and so forth, the architecture presented in this invention is highly scalable. If an application requires more long-living variables, it is possible to only increase the size of the local storage without degrading the overall architecture efficiency and speed. This is not the case in shared register machines where the central register file does not scale well, especially if it is strongly multiported.

As communications are specified explicitly, provide synchronization means and allow to manage data, the described processor has a strongly simplified microarchitecture compared to other parallel processors. Indeed, it is not necessary to have a complex bypass circuit, a multiported register file, a pipeline to perform data updates or even complex routing resources like in other parallel processors. This processor allows therefore to reduce the implementation complexity, to have a higher scalability and power efficiency while exploiting instruction-level parallelism and synchronizing the execution.

Description of a Preferred Embodiment

High-efficiency in-order RISC processor cores use a register file to communicate data between instructions. In-order parallel RISC cores use a central register file as a central data pool between the execution units. Register files are complex to implement and limit the scalability of parallel platforms. Furthermore, register-based data communications require additional microarchitecture supports to maintain a correct execution state in pipelined implementations. This causes parallel VLIW processors to be further limited by a complex bypass network introducing power overheads and frequency limitations. Those drawbacks degrade the power efficiency of in-order VLIW cores able to exploit instruction-level parallelism and therefore they limit their use in homogeneous multicore platforms.

The LiteFlow processor model presented here is an embodiment of the present invention. It allows to make highly efficient parallel processor cores able to exploit fine-grain ILP. It does not use a central register file with its complex worst case bypass network. It uses instead direct point-to-point communication links between execution units together with explicit data communications fully specified by the instructions. It also provides a fast and efficient inter-core communication mean, making it a suitable solution for high-efficiency homogeneous multicore platforms.

The LiteFlow embodiment is a tile-based architecture model. A LiteFlow processor is made of clusters grouping a set of independent tiles. Each tile controls an execution unit by executing instructions in a dataflow-like way. All data communications inside and between computation tiles and clusters are explicit and use direct point-to-point dataflow-like links referred in the following as DCL for data communication links. A very simple embodiment of a DCL can be a small synchronous FIFOs. DCL are used to communicate data between instructions without using register indexes or tags. Controls associated with DCL are used for execution synchronization between instructions in different tiles or threads between clusters. This local execution control in processor tiles avoids long wires used for synchronization and control signals. Computation uses only DCLs and does not use a central shared data pool maintained by microarchitecture like the central register file in VLIW processors. Since DCLs manipulate data atomically by implementing transactional communication primitives, they are scalable and insensitive to latency, making them an appropriate communication means for large parallel platforms.

Figure 2:
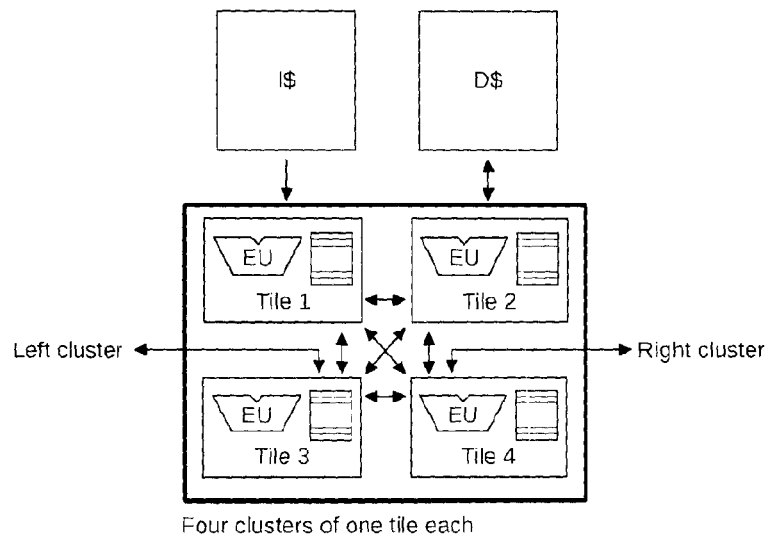
FIG. 2: Processor embodiment made of four clusters of one tile each. Tiles are connected by DCLs made of point-to-point communication links.

A LiteFlow processor is shown in FIG. 2. It is made of four clusters grouping one tile each using private instruction and data caches or scratchpads. Neighboring clusters are tightly coupled by point-to-point DCLs. Those tight connections are very fast and propagate control information that enables to efficiently execute a single thread over several clusters. The instruction cache memory in FIG. 2 can seen as an L2 cache using a dedicated memory network not represented in the figure.

In this embodiment, each cluster is made of a single tile connected by a local network made of point-to-point DCLs. It is connected to data and instruction caches or scratchpads. Data cache can be accessed by several tiles by executing memory operations depending on the implementation. A tile in this embodiment has one or more execution unit EU, a local memory LMEM to hold long living data. In this embodiment, each cluster has a local instruction memory called here SEB-BUFF holding blocks of code executed on the cluster. Since each cluster of this embodiment has one tile, each tile here executes a sequential thread of code with branches.

By grouping a set of connected tiles with their cluster, the processor of the embodiment can be seen here as a light dataflow-like execution engine with only one instruction slot per tile. The dataflow-like refers to the execution that is triggered by some data or resources availability. The engine executes instructions from the sequential threads in tiles. Instructions are selected to be the next candidate from the sequential flow scheduled statically. The instructions are finally executed when all their operands are available in the engine. The dataflow-like engine itself is made of fixed point-to-point DCL links communicating unnamed data tokens between instruction slots. The instruction window of the execution engine is very small and corresponds to the number of tiles in the cluster. This small window size allows the dataflow-like engine to be very power-efficient and low complexity. It allows to implement dataflow-like execution without the burden of content accessed instruction queues or tables.

Instructions bundles in this embodiment group several instructions that can be executed in parallel. Communications between instructions are done by means of DCLs and their execution is triggered by the availability of data and destination DCLs. Execution is directed by the instruction bundle loaded in the cluster register called here CTRL-REG. A tile can execute 4 types of instructions in parallel, they are:

Arithmetic, main memory
Data displacement by move operations
Local memory accesses
Branch operations in the instruction buffer Several instances of a same instruction, except for branches, can be present in the tile depending on the implementation of the embodiment.

The LiteFlow model embodiment has the particularity to make most of the data communications inside the processor explicit and visible to the compiler, while it is still instruction-centric. This means that it is still the data transformation operations like arithmetic or memory operations that drives computation. Communication is automatically achieved by operands selection and can be seen as a side effect of instruction execution. Instead of naming variable by register index or by using tags together with a complex microarchitecture to maintain a correct state, data are explicitly taken from and forwarded to statically-defined producer/consumer pairs. This approach allows to optimize data communication at compiler-level by for example placing producer/consumer pairs in neighboring tiles or kernels in neighboring clusters. It allows to minimize data broadcast to only operations or tiles that really use it. This explicit and optimized data communication between operations is less complex and less power hungry than using a central data pool. Indeed, a central register file maintained by a dedicated microarchitecture requires the data to travel through all pipeline stages consuming unnecessary power.

Communications between clusters are handled by DCLs the same way they are handled inside clusters. In FIG. 2 two DCLs from left and right clusters end respectively in Tile 3 and Tile 4. They are used by instructions as local DCLs. Since communication DCLs are fully visible by the compiler, those limited connections between neighboring clusters is sufficient to span a thread over several clusters and a worst case full-connected crossbar is not necessary as for indexed registers. Furthermore, execution synchronization is fully handled by those inter-cluster DCLs. All this makes DCL-based inter-cluster communications a scalable approach.

Communications inside LiteFlow processors embodiments are handled by point-to-point links called DCL. They are used for data communications between instructions. Those communications can be local inside a tile, between different tiles or even between clusters.

Figure 3:
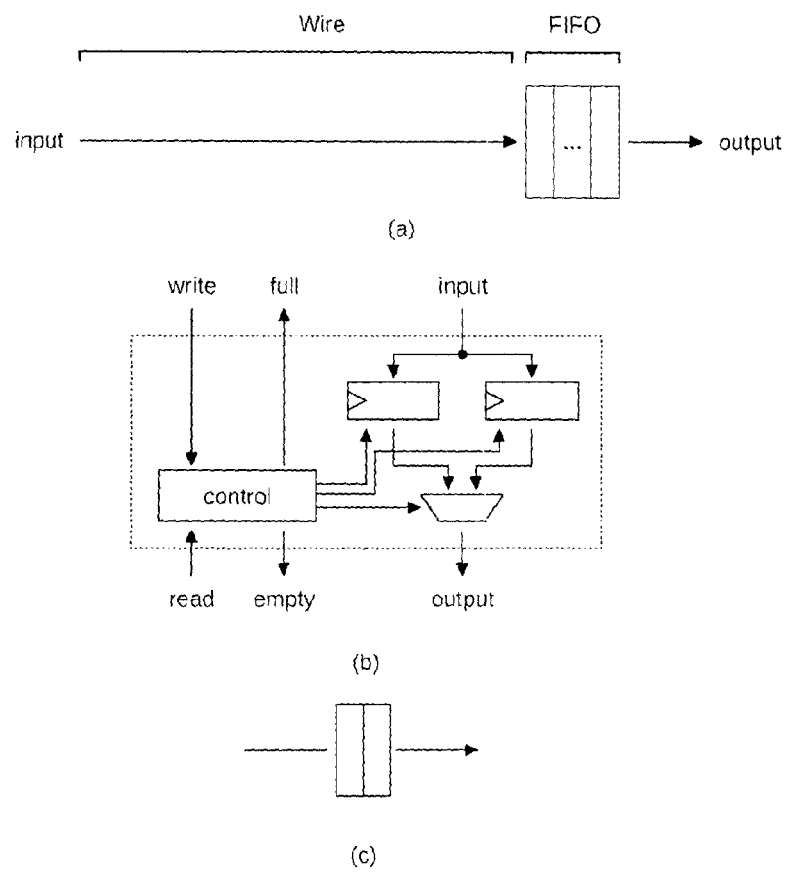
FIG. 3: Very simple and limited DCL embodiment. Made of a FIFO and a wire (a), typical 2 register FIFO implementation with its control signals (b), symbol used to represent simple DCLs embodiment (c).

A simple basic DCL embodiment with degraded functionalities can be implemented by a wire and a FIFO. With this embodiment of DCL, many data management functions like are not supported or need to be implemented around the FIFO or in the tile. With this simple embodiment, the FIFO size is very short, between one and three registers, typically two. Bigger FIFO are used for pipelining between distant tiles. FIG. 3 (a) shows this simple DCL embodiment made of a wire followed by a FIFO. A typical implementation of a 2-register FIFO is given in FIG. 3 (b). It is mainly composed of two registers, a multiplexer and a controller managing register content state. Compared to a simple communication register, the critical path of this restricted DCL embodiment is only augmented by the FIFO multiplexer.

The simple DCL embodiment is made using control signals of the FIFO. A write signal allows to introduce a new data in the FIFO and a read signal removes a data in the first in first out order. Two additional signals, full and empty provide information on the FIFO state. A full active means that the FIFO has no empty registers and may not be written without incurring an undetermined behavior and an empty active has meaningless data at its output that can obviously not be read. FIG. 3 (c) shows the symbol used to represent this simple DCL embodiment in the following.

Using FIFO based DCL allows dataflow execution in tiles which is execution triggered by data availability. Indeed, FIFO can make data transportation in one direction but it can transport control information in two directions. A consumer at the end of a FIFO knows if he can proceed computation if the FIFO is not empty, that is when the empty signal is reset. There is therefore a control information transfer from a producer at a FIFO input that can trigger a consumer at its output by just writing a data. Conversely, a producer at a FIFO input can proceed computation only if he can write its result in a not full FIFO, that occurs when the full signal is reset. If the FIFO is full the producer cannot proceed and must wait. Here the control information transfer is from a consumer at the FIFO output that can trigger producer execution by removing a data from a full FIFO, allowing it to compute and write its result.

When the FIFO has more than one register, critical path for its control can be decoupled between its input and output sides. Indeed, a not full FIFO can always be written no matter if its output side will be read out or not, and a non empty FIFO has always a valid data at its output no matter if its input will be written. A usual pipeline stage does not provide this decoupling mechanism and control signals between stages have to cross stages border leading to long control path across stages. This drawback is called pipeline interlocking that causes problematic critical paths in RISC pipelined processors.

Instruction execution explicitly control DCLs and control is always local to a tile. This means that a data is always explicitly written in a DCL by an instruction and always read out by another one. The particularity is that DCLs handle data atomically. A data is explicitly written in a DCL when there is place left, but it is also explicitly destroyed at its end. A register can always be written and read even if its value is meaningless. A central controller has to know and manage its state. In a LiteFlow processor embodiment overall control is distributed between local instruction control in tiles and DCLs. DCLs make data manipulation transactional that is insensitive to latency, which is an advantage for large parallel platforms.

The DCL embodiments here are communication resources with limited temporary storage capability. They preserve data order, the order in which data are written in a DCL is the same as the order they are read at its end. A consequence is that when a data is not read at a DCL output, while a producer continues to write in its input, it blocks after the FIFO is full. Data are sent to a particular tile through them by explicitly choosing the dedicated link.

They therefore do not use any register index or tag or address to distinguish data or destination ports.

Figure 4:
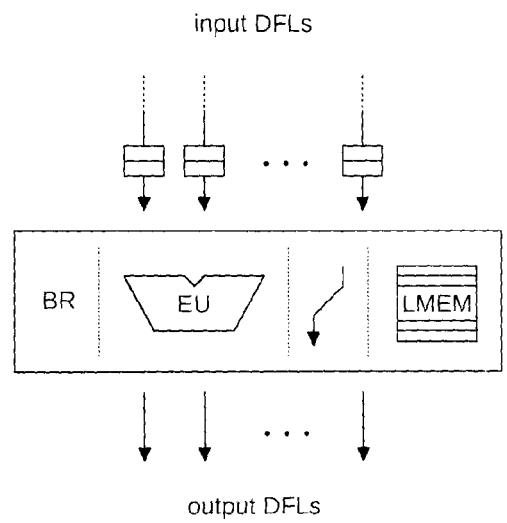
FIG. 4: A tile embodiment with four instructions. Operands are taken from input DCLs and results send to one or several output DCLs.

Instruction bundles direct operations execution in tiles. All instructions communicate explicitly data by means of DCLs. Data communications can be local in a tile or between tiles. Those explicit communications are specified by instructions. All instructions take their operands from DCLs, and explicitly write their results into DCLs. FIG. 4 shows a tile of the embodiment with its four instruction types, branch, arithmetic, move and local memory. They all take input data from the input DCLs and send their results to one or more output DCLs. In this embodiment, at least one DCL loops back from the output to the input of the same tile in order to reuse or save locally a produced result.

Upon taking operands from DCL input and sending results to DCL outputs, operands and results manipulation in LiteFlow processors embodiment have two more specificities: programmed operands consumption and selective result broadcast. When an operation uses a data from an input DCL, its does not necessarily consume it. This means that a data is not automatically read out of the DCL FIFO embodiment after being used. Instead, for each DCL source used, instructions specify if data has to be read out or not. This allows to keep a data at a DCL end for multiple use without requiring to issue copy operations. Regarding result broadcast, instructions explicitly specify all DCLs where a result has to be sent. Result data is then propagated only through those DCLs but not through the unspecified one. Therefore, there is switching activity only in used DCLs and not in all connected destination DCLs. Gating circuit prevent switching in DCLs with long entry wire. This selective destination broadcasting directed by the instruction allows to consume power only for useful communications. It is completely different of the worst case bypass network broadcasting in register file-based architectures.

Figure 5:
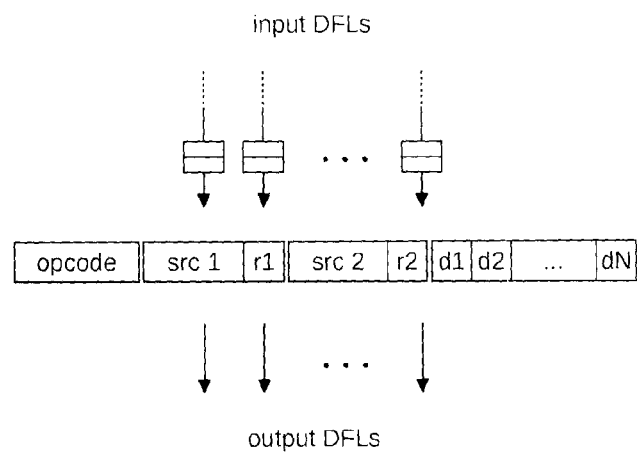
FIG. 5: Embodiment of an arithmetic instruction.

An example of an instruction embodiment implementing optional source consumption and individual destination selection is shown in FIG. 5. It is a typical arithmetic operation taking two operands and producing a result. opcode field coding operation to perform is followed by two source fields src and src2 selecting the input DCLs to use as operands. Associated with those two sources there are two read bits r1 and r2 indicating if data operands has to be read out of their DCLs or can be left for a future reuse. Finally, the destination field coded as a bit field d1 . . . dN of size N for N outputs specifies for each output DCL whether it has to broadcast the result or not. For a tile with 8 input DCLs and 8 output DCLs and an 8 bits opcode, sources fields are coded on 3 bits and destination on 8, leading to a 24 bits wide arithmetic operation.

Even if in LiteFlow processors embodiment communications are explicit, instructions directing data transformations still drive computation. Communication is the side effect of taking operands and broadcasting results from and to DCLs but not the main task. Most of communications and data movements are therefore achieved along with computation and does not require dedicated communication processes or heterogeneous resources.

A processor tile of the embodiment is organized around two buses, operands and results buses. Operands bus connects incoming DCLs extremities with operation input ports. Results bus connects operation output ports with outgoing DCLs. Even if it is called bus here, it more complex due to control transfer between processing units and DCLs. Each operation takes its operands and send its results through those buses to reach DCLs. In the presented embodiment they are implemented with simple multiplexers. Control is managed here at tile-level based on instructions, input data availability and output resources readiness. Operands selection and result broadcast are performed in the same cycle than computation. Most of the integer arithmetic operations, moves and local memory operations are executed in one cycle. For more complex operations execution units can be pipelined. Main memory space accesses are done by means of load store instructions that are executed by a functional unit like a usual arithmetic operations. Dedicated functional unit is therefore used to access cache or scratchpad memory arrays that are not connected by DCLs.

In the embodiment, the use of internal pipeline in execution unit does not block following instructions execution unless they send their result at the same time in a same destination DCL. Indeed, when there are multiple operations executed in the execution unit pipeline or on other resources, tile controller preserves the destination broadcasting order in each DCL, defined by the used destinations in instructions and the instruction sequential order.

Figure 6:
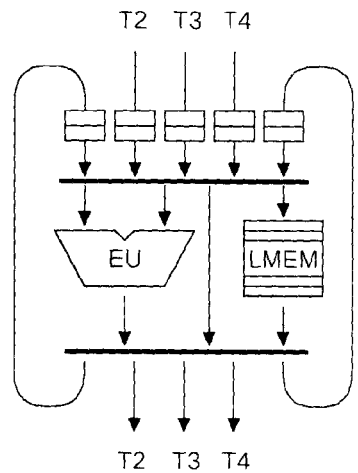
FIG. 6: A processor tile embodiment T1 with two local DCLs connected with three other tiles T2, T3 and T4 part of a cluster.

A tile embodiment of the LiteFlow processor is shown in FIG. 6. It is named as T1 and is connected with 3 other tiles indexed T2, T3 and T4 part of a same cluster. The tile has 5 input DCLs and 5 output DCLs. Three inputs and outputs are used to communicate with the other tiles of the cluster and two of them are local looping DCLs. Those local DCLs are necessary to reuse a data in the same tile or to access data from the local memory. The tile shown has an execution unit EU, a move unit symbolized by the vertical arrow between the two buses and a local memory LMEM. There are also a local branch unit and a local instruction that are not represented in the figure but are detailed in the following chapter. Though there is one instance of each operation type in the example, several instances of each operation may be present in a tile. It is for example possible to have two execution units and two move operations, or it is even possible to have only a move and a local memory without execution unit.

Conditional branches require flags to determine their outcome. For this, in this embodiment dedicated one-bit flag DCLs connect tiles between each other the same way they are connected by data DCLs. Those flag DCLs are not represented in the figure for clarity reason. Flag DCLs allow all tiles of a cluster to execute a same thread in parallel. The thread can then be controlled easily by branches or conditional branches with the outcome computed on one tile but control transferred over all the cluster.

Figure 7:
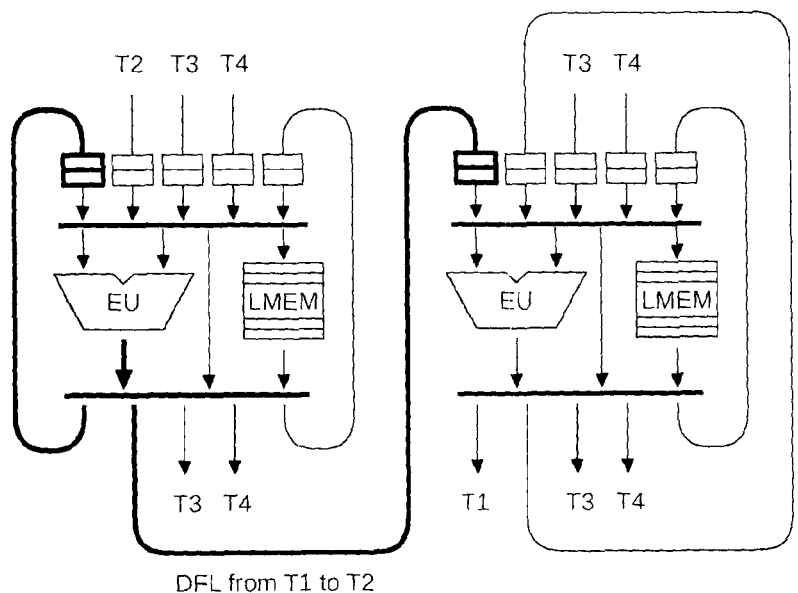
FIG. 7: DCLs replace pipeline registers for data manipulation in the embodiment.

Pipeline registers for data that are used and produced by computation are implemented by DCLs. There are no other pipeline registers used for data manipulation except those that can be embedded in a functional units local to a processing element. When a tile produces a result used by itself or another tile, it is stored in DCLs replacing pipeline registers at the end of the computation cycle. FIG. 7 shows the two tiles T1 and T2 where only the DCL between T1 and T2 is shown. The tiles are the same as in FIG. 6.

Execution unit of T1 produces a result that will be used by itself and T2. Result data is therefore sent at the end of the computation cycle through one loop DCL in T1 and the DCL between T1 and T2. It is depicted in the figure by bold lines. At the end of the cycle the data is latched in the DCL and available the very next cycle in the two tiles. Note that the multiple destination capability allows data duplication without using dedicated copy operations as it is the case in most dataflow architectures.

Figure 8:
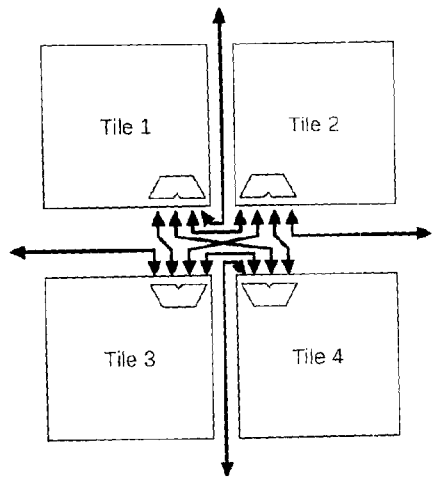
FIG. 8: Cluster embodiment floorplan with very short DCLs between tile embodiments allowing to communicate in the same cycle than computation. The outgoing and incoming DCLs communicate to other clusters, they are slower due to wire latency.

If a data communication path has still to be further pipelined due to long wire latency, it is the FIFO in the DCL embodiment that implements the extra pipeline stages. It is the case for DCLs communicating between neighboring clusters. Indeed, internal cluster communications are optimized to be performed in the same cycle than computation while DCLs crossing cluster border can take one full cycle to transport data due to wire length depending to the embodiment. Very short internal cluster communication latency is achieved by floorplanning cluster tiles with their DCLs ending very close to each other as shown in FIG. 8. Thanks to the multiple routing levels available in sub-micron technologies, DCL length shown in the figure can be shortened in order to reduce communication latency to a relatively small fraction of the critical path. The four inter-cluster DCLs as shown in FIG. 8 are longer and slower due to wires latencies.

In this embodiment, each cluster executes its own code independently without using a global controller. Nevertheless, they do not execute an instruction every cycle like in usual RISC machines. Execution is done in a dataflow-like way, it is synchronized by input data availability and output DCLs readiness, that can causes instructions to wait. This dataflow-like execution is possible due to dataflow-like behavior enabled by FIFO embedded in the simple DCL embodiments. A producer can trigger execution of a consumer by sending a data through a FIFO and a consumer can trigger execution of a producer by removing a data from a full FIFO.

The instructions that are part of an instruction bundle executed on a tile can be executed independently depending on their DCL status. An operation can be executed if all its operands are available and all its destinations can be used. All its operands are available when all the input DCLs where the operands are taken from are non empty. All its destinations can be used if all the output DCLs where the result has to be written are not full. For multi-cycle or pipelined operations, the first execution cycle needs operands to be available but not destinations and the last execution cycle needs only destinations to be ready. When several operations are under execution, the tile controller maintains the writing order in destination DCLs. The writing order in a given DCL is defined by the sequential order of instructions.

When an instruction is fetched in a tile its operations are executed asynchronously, meaning that once all DCLs of an operation are ready it can be executed. The only exception is for branch operations that are always executed as the last operation in the operation bundle. Indeed, the cycle after a branch operation is executed, a new instruction is overwritten in the tile control register and all previous operations must have been executed or at least start their execution. The execution of an instruction may take several cycles depending on data availability, if all data and output DCLs are ready it is executed in one cycle.

instructions part of an instruction bundle on a tile may be executed asynchronously but may also share the same input and output DCL. Two operations may use a same input DCL and hence a same data. They may also use the same destination DCL for broadcasting their results. To avoid an operation to consume a data that is used by another operation not already executed and for shared destinations, there is a predefined order in operation execution in case of conflicting resource use. Normally this order is coded in the instruction. Nevertheless, in this embodiment, this order is hardcoded in hardware but it can also be configurable by means of a configuration register. The order in this embodiment is first local memory accesses, then moves, then arithmetic and main memory operations and finally branch. In this kind of execution, operations are executed during different cycles and the entire instruction bundle takes several cycles to be completed.

Independent tile execution using dataflow-like synchronization is dynamically scheduled following data dependencies and is tolerant to dynamic execution latencies. Code is close to its dataflow graph that has to be placed and routed on tiles instead of being scheduled like in RISC architectures. An advantage of dynamic scheduling is that code does not require to be padded with nops nor to use prologues and epilogues as with software-pipelined loops. This dynamic scheduling is therefore useful for large parallel applications like those distributed on homogeneous multicore platforms.

Dataflow-like execution can encounter deadlocks. They can be caused by an error in the code or by a very high latency I/O causing both to put a cluster in a long unpredicted waiting state. The error in the code can be mitigated by compiling code from correct sequential definition of the program where all variables are necessary defined and initialized before being used. Nevertheless, if there is still a deadlock error in the code, it is easy to detect that all the tiles in a cluster are waiting with no long latency operations like cache misses. The deadlock can therefore be detected the next cycle after its occurrence and used to issue an interruption. It is worth noting that an error in the code generates most of the time a deadlock. It has the advantage to avoid further machine state corruption like in sequential register machine where processors can run a long time and corrupt the memory content until a segmentation fault interrupt its execution.

Unpredicted long latency dataflow I/Os can cause the processor to wait during an indeterminate amount of time causing its computation to be blocked. This problem is mitigated in the LiteFlow embodiment by a test_dfl instruction that tests if a particular DCL has a data ready or not. By this, a loop can periodically poll the unpredicted I/O to check whether a data can be processed or not. The test_dfl instruction generates a flag that can be used to conditionally branch to the I/O processing subroutine.

The spatial computation on parallel executing clusters has the particularity to require binaries that depends on the cluster position in the entire processor. In addition to address relocation capability, spatial object code requires also spatial relocation capability in order to be able to move computation between clusters. The portability of the code can be enabled by a generic decode stage and by dynamic spatial relocation capability.

Code execution in LiteFlow processors is highly parallel. This parallelism occurs between instructions in an instruction bundle, between instructions on cluster tiles and between clusters. Point-to-point dataflow links are used together with explicit communications instead of using random register access by means of indexes. Long living variable are kept in small local memories. DCLs are fundamentally different than registers because they handle data atomically and all their ends cannot be accessed randomly by operations. They are local and most of them are connected to two different tiles. DCL FIFO registers are used as pipeline registers for computation. By this, DCLs connect most operations together so that a data computed during a cycle by one operation can be used by another the very next cycle. Communications between operations by means of DCLs can be seen in this embodiment to be at the same place than bypass network for scalar RISC pipelines and VLIW. The difference is that: (i) data are handled atomically, (ii) they are used for execution synchronization, (iii) there is no dynamic register tag comparison, (iv) data only travel to selected point-to-point links and finally, (v) they are not written back in a register file afterwards. Full bypass network broadcast, central register files and their dedicated pipeline stages are known to be highly power consuming and limit power efficiency in embedded platforms using central register files.

DCL point-to-point network allows to distinguish data without using tags or register indexes even if data are exchanged between independent executing tiles. A tile differentiate one data from another by choosing its arrival DCL and its order in the DCL data sequence. Compiler has therefore to precisely know global execution context encompassing all used tiles. An example is given in FIG. 9.

Figure 9:
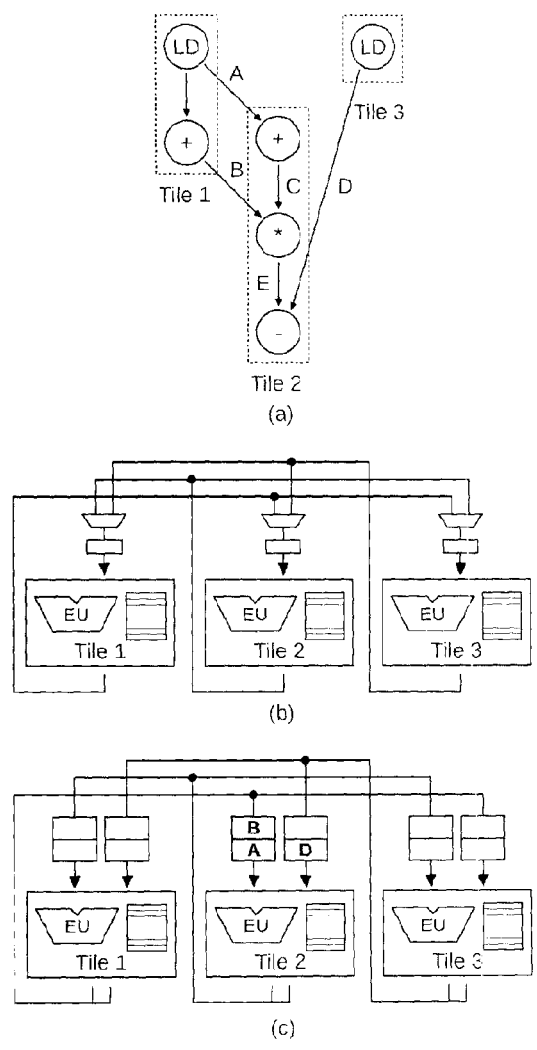
FIG. 9: Data differentiation example of a program fragment (a) by means of a network (b) and with DCL (c).

A small program fragment executed on three tiles is given in FIG. 9 (a). tiles 1 produces and send data A and B to tile 2 and tile 3 produces and send data D to tile 2. FIG. 9 (b) shows communication network between tiles implemented by a standard bus or network having therefore a single entry port in each tiles as it would also be the case for NoC. FIG. 9 (c) is a point-to-point DCL implementation of the network. Tiles 1 and 3 start their execution by loading A and D from two separate memories. Due to cache miss issue but also because the two tiles execute code independently, A can be send before D or D before A, the exact time slot is data dependent and therefore determined dynamically. When using a standard bus or NoC solution with independently controlled tiles like in Figure FIG. 9 (b), it is not possible from tile 2 to know which of A, or D will arrive first. It is therefore necessary to tag data with an index, that can be for example a local register location, in order to be able to dynamically differentiate A, B and D. With the point-to-point DCL network implementation in Figure FIG. 9 (c), A and B will necessary arrive in DCL from tile 1 and D in DCL from tile 3. Since A is produced before B in tile 1, arrival order in DCL from tile 1 is A followed by B and all data can be differentiate without using tags.

In the presented embodiment, there are three types of memory storages. Large arrays accessed by usual Load/Stores operations implemented by scratchpads or caches, small local memories in tiles accessed by a dedicated operator and DCL registers. The two last one are used to replace register files in RISC architectures used to store temporary variables. Those variables can be classified depending on their life time. Very short living variables are simply stored in DCLs. They can be used by an immediately following operation after being produced. They can even be used several times since a data is not automatically destroyed from a DCL and can be locally reused by several operations. Due to the broadcast capability of instructions in multiple output DCLs, a single data can be easily duplicated in several locations. Long living variable can stay in a DCL that will be reserved for a particular data during its living period. They can also be stored in local memory of one or several tiles. Once a variable is in local memory, it needs to be read a cycle before being used in operation execution. A dedicated local memory operation has therefore to be issued in a previous instruction. The total data storage of a cluster includes local memory storage and DCLs, though all cannot be randomly accessed.

For a cluster of 4 tiles like in FIG. 6 assuming a local memory of 8 data words, there are 32 local memory entries and 20 DCLs with a total of 52 data storage locations. An important advantage to note regarding register usage in LiteFlow processors embodiment is that dataflow execution is natively pipelined. This allows pipelined long latencies operations like multi-cycles loads to be executed every cycle while sending results in a same DCL. In RISC register architectures loop unrolling has to be used causing higher register consumption.

Figure 10:
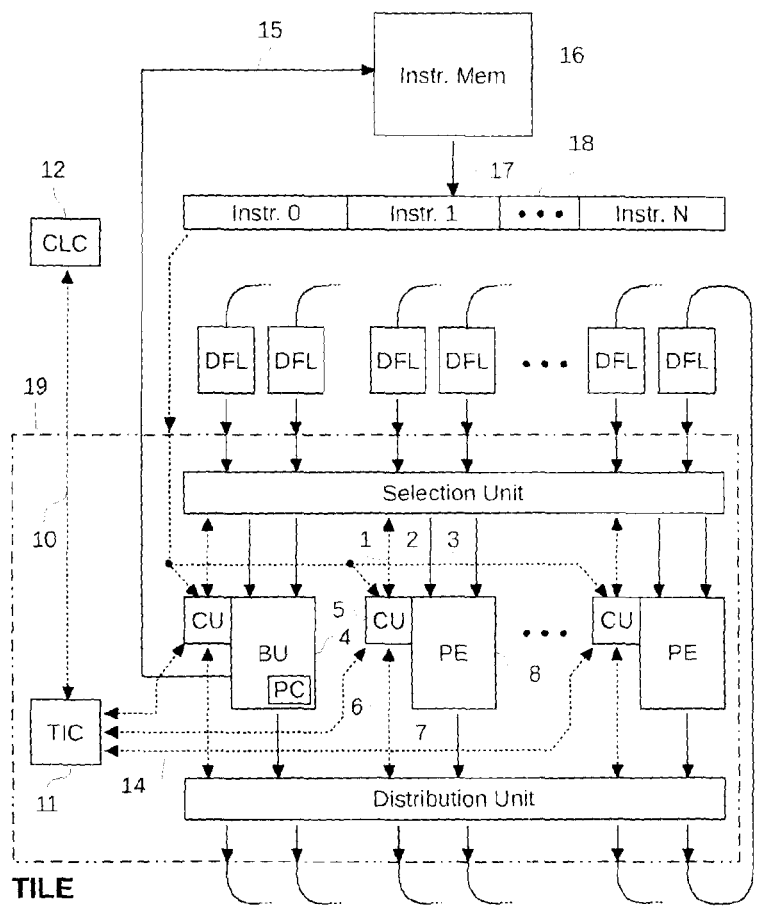
FIG. 10: Embodiment of a cluster made of a tile embodiment.

FIG. 10 depicts another embodiment of the invention. The embodiment is made of clusters of one tile. The tile is controlled by a tile controller name TIC FIG. 10.11. Processing elements FIG. 10.8 are controlled by a local control unit (CU) FIG. 10.5. The cluster is controlled by a cluster controller (CLC) FIG. 10.12. Processing elements take their operands through a selection unit on the request of the CU of the processing element. Processing elements send their results to a distribution unit accessing DCLs under the control of the CU. Selection units and distribution units can be irregular, this means all DCLs are not available to all processing element ports. This feature allows to reduce the complexity of those units. The branch unit holds the program counter and provide the address FIG. 10.15 of the next instruction bundle to store in the instruction bundle register FIG. 10.18. In this embodiment, branches can be delayed and can be statically predicted branches.

The invention concerns also a new and inventive code organization. The code organization presented here is for programs running on a cluster of tiles according to the invention, or more generally a set of processing elements. Instead of being a sequence of atomic instructions, a program is organized here in blocks and has two execution levels. The first level loads blocks of code on the cluster. Those blocks are made of small and private code segments, one for each tile. The second level sequentially executes each segment in parallel on each tile. The first level is executed from the main instruction memory space while the second level is locally executed from a small local buffer using a local and private address space. This local address space allows fast local branches by using immediate target addresses. Once a block has been loaded on a cluster, instructions can be re-executed directly from their local memory without requiring to be reloaded from the cache.

This two-level code execution has three main advantages that will be detailed in the remainder of this chapter. First, when the local instruction memory captures a loop, the fetch power consumption is dominated by the local memory access power, which is far less than a cache access. Second, local branches in local code allow to capture loops embodying complex control paths which increases the number of reused loops. Third, executing a conditional branch in the local buffer using immediate address allows a very short pipeline which causes branches to have a very limited penalty. This allows to execute branch intensive code without incurring important performance loss or without using power-hungry mitigation techniques.

Figure 11:
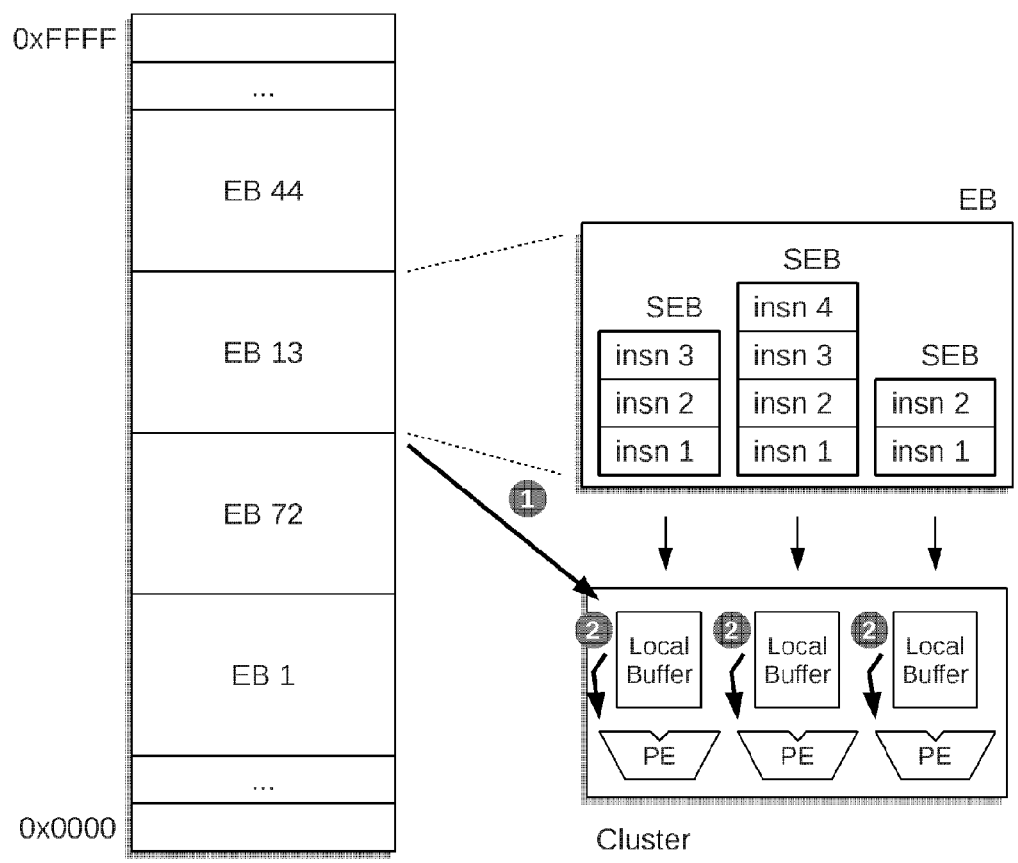
FIG. 11: The first level (1) fetch EB to local buffers in the tiles of a cluster and the second level (2) sequentially executes instructions in each tile.

As shown in Figure FIG. 11, there are two execution levels. In the first level, blocks of code called execution blocks (EB) are fetched from the main instruction memory. They are made of code segments called sub-execution blocs (SEB). A SEB is a small instruction segment targeted to be executed on a tile. EB are fetched from the main instruction memory space and their code segments are distributed to the local buffers of the tiles in the cluster. In the second execution level, SEB are executed independently and in parallel on all tiles of the cluster. Their instructions are fetched from local buffers and are processed in tile execution pipelines.

There is not a unique address space for the program where instructions are atomically addressed and executed. There is a main address space where EB are addressed and multiple local address spaces, one for each SEB. Two levels of branches are associated with the two execution levels. At the first level, branches modify the execution flow between EB and targeted addresses are expressed in the main address space. At the second level, branches allow to modify the execution flow inside a SEB executed on a tile and short target addresses are expressed in the local address space of the local buffer.

Figure 12:
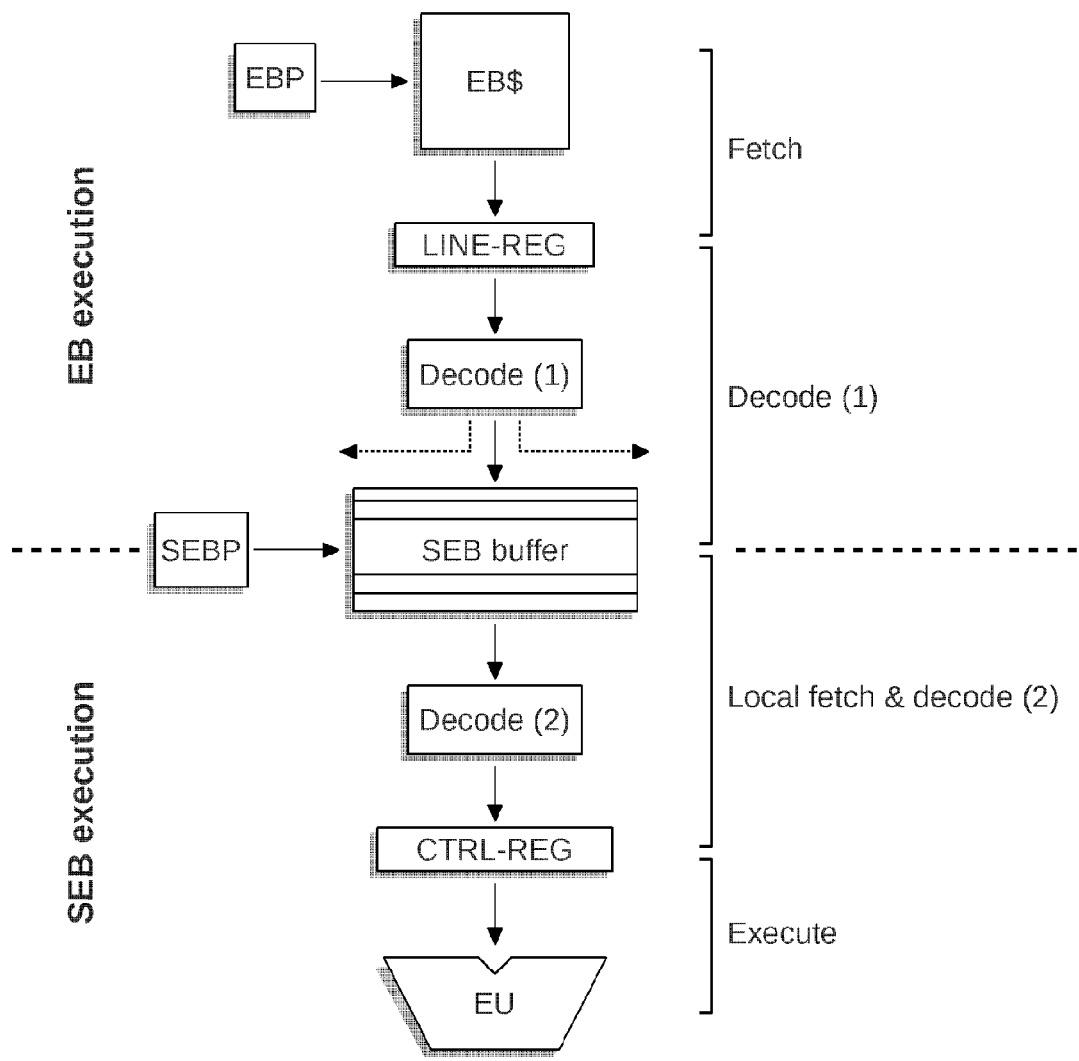
FIG. 12: Overall execution pipeline implementing the two execution levels.

The overall execution pipeline implementing the two execution levels is shown in FIG. 12. It has four stages starting from EB cache and ending in the tile execution stage. The first two first stages are related to the EB execution level while the last two are related to the SEB execution level. In the first execution level, blocks are fetched from the EB cache and their SEB are written to the tiles local buffers. In the second execution level SEB are independently executed in each tile of the cluster. Only one SEB execution in one tile is represented in FIG. 12, SEB distribution to other tiles is depicted by the dotted lines leaving the last EB execution stage. EB cache is accessed by means of the EB pointer register EBP, while instructions in a SEB are accessed by means of the SEB pointer register SEBP. EB are fetched line by line from the cache using the line register LINE-REG in the pipeline.

Instructions are decoded in two steps, the first and main decoding step is done when EB are loaded from the main instruction memory and written in local memories holding SEB. The second step is performed when instructions are read from the SEB buffer to the tile control register. Those two steps are noted Decode (1) and Decode (2) in FIG. 12. The first decoding step before writing in SEB buffer does the most of the decoding while the second step only expands instructions stored in SEB buffer. Since this second step has a very low complexity, it allows to immediately execute instructions fetched from local buffer without requiring a dedicated pipeline stage. The compressed instruction format in the buffer allows to maintain its size reasonable. This two-step decoding makes a trade-off between decoding latency and buffer size.

SEB are packed into EB and are written in the local buffer of each tile of a cluster during EB execution. They are made of an instruction sequence coding the real computation to perform by the program. During SEB execution, instructions are fetched from the SEB buffer and executed on the tile. Due to the two step decoding there is no need for a dedicated decode pipeline stage. Furthermore, since tiles do not use register files for operands, there is no need for register read and write back stages. SEB execution requires only two pipeline stages to execute instructions, that are local instruction memory fetch and execute, Local fetch & decode (2) and Execute in FIG. 12.

SEB are written in a small local memory directly accessed as a scratchpad with no cache mechanism support. This local memory implements a private address space. The SEB size is therefore limited by the size of the local memory that must be big enough to hold an entire SEB.

The execution of a SEB always starts by its first instruction. After that, internal branches are free to target any instruction in the SEB. The execution order inside a SEB is sequential. It means that if the control flow is not disrupted by a branch, the following instruction implicitly executed is the one located at the next address. Since branches are free to target any instruction, loops or even nested loops can be repeatedly executed from local SEB buffer without requiring to repeatedly reload the EB from instruction cache.

Figure 13:
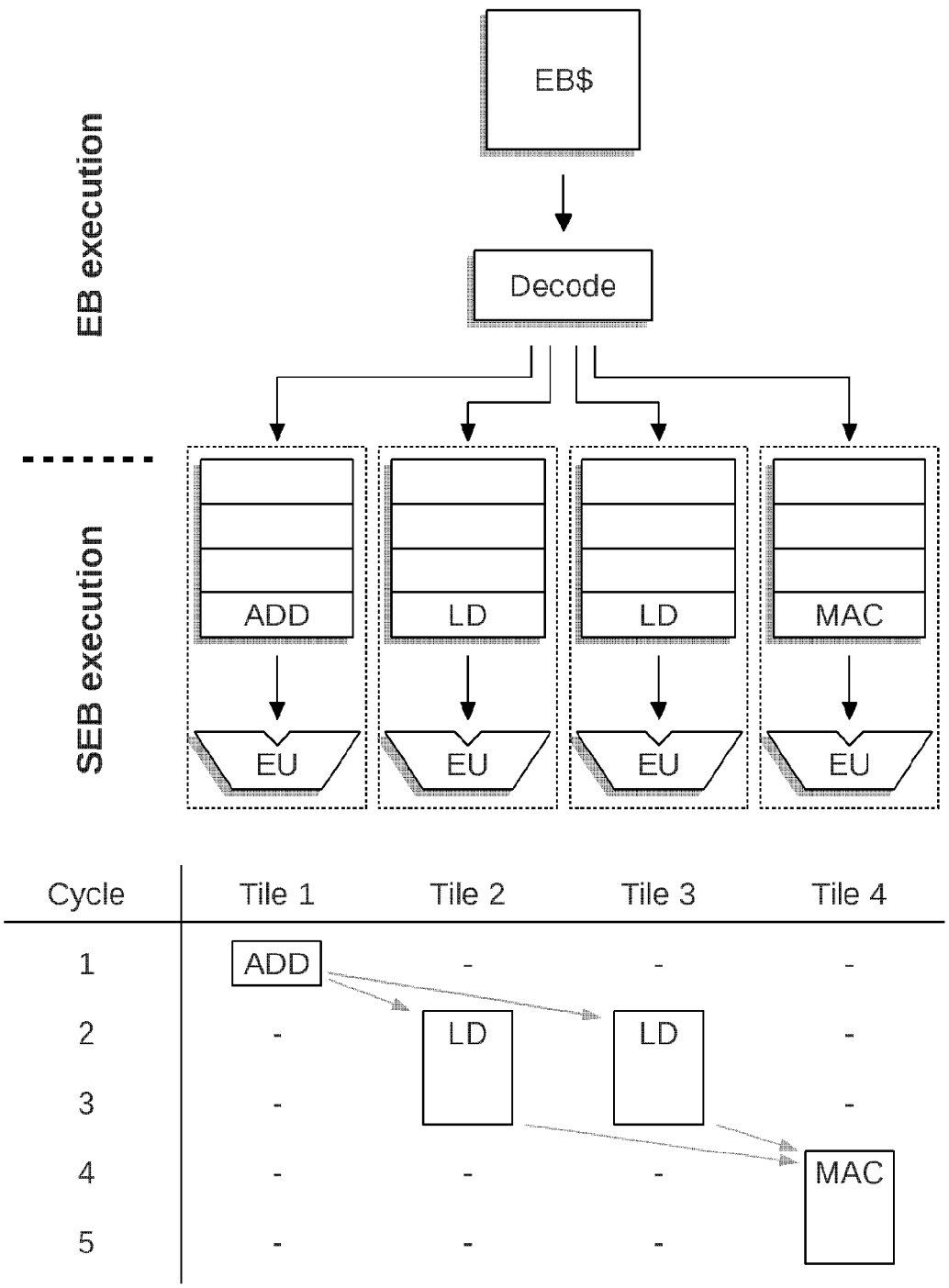
FIG. 13: Execution slots of independent execution of SEB code segments in cluster tiles.

Once an EB is loaded and starts its execution, all SEBs are executed in parallel on all the tiles of the cluster. The execution order inside a SEB is sequential but the execution order of instructions belonging to different SEB is not defined. Indeed, since the execution of an instruction depends on its operand availability, its execution order inside a SEB is guaranteed by its position in the code segment, but not its real execution time slot. The real execution slot of an instruction is dynamically determined and can be influenced by external latencies like a data cache miss or an operand dependency coming from another tile. FIG. 13 gives example of independent SEB execution on a 4 tiles cluster.

The example is taken from the FIR filter kernel. It first increments an index variable by an addition, then loads a data and a coefficient to finally multiply them and accumulate the result. Each SEB holds a single instruction located at their first address. They are all issued during the first cycle, but due to data dependencies they are not all executed during this cycle. Their real execution is triggered by operand availability and the execution is independently controlled in each tile. The table at the bottom of the figure gives the execution slot of each instruction. Load and MAC operations take two cycles. Data movements causing dependencies are represented in the figure by shaded arrows. It is important to note that due to independent execution control in each tile and dataflow execution, it is not necessary to pad code segments with nops to statically schedule a correct execution. This also removes the need for prologue and epilogue parts in software pipelined kernels, reducing program instruction count.

A SEB execution starts always by its first instruction. After that, internal branches are free and can target any instruction. A branch instruction can be executed alone in the code or it can be part of an operation bundle like in VLIW code but still for a single tile. In the latter case, its execution can be synchronized or not with other operations part of the instruction. When it is not synchronized, all operations of an instruction are not committed at once but the branch operation if any is always committed at last. This is required to avoid rewriting a not completely finished operation bundle by fetching a new one.

The local instruction memory implements a local and private address space. This address space has a limited size and is typically less or even far less than 256 instructions. Due to the use of small addresses less than one byte, branch target addresses are directly provided in the code as immediate values. Indeed, such small addresses do not need to be relative and computed by adding a displacement to the current next address as it is the case in a wide 32 bits address space.

Figure 14:
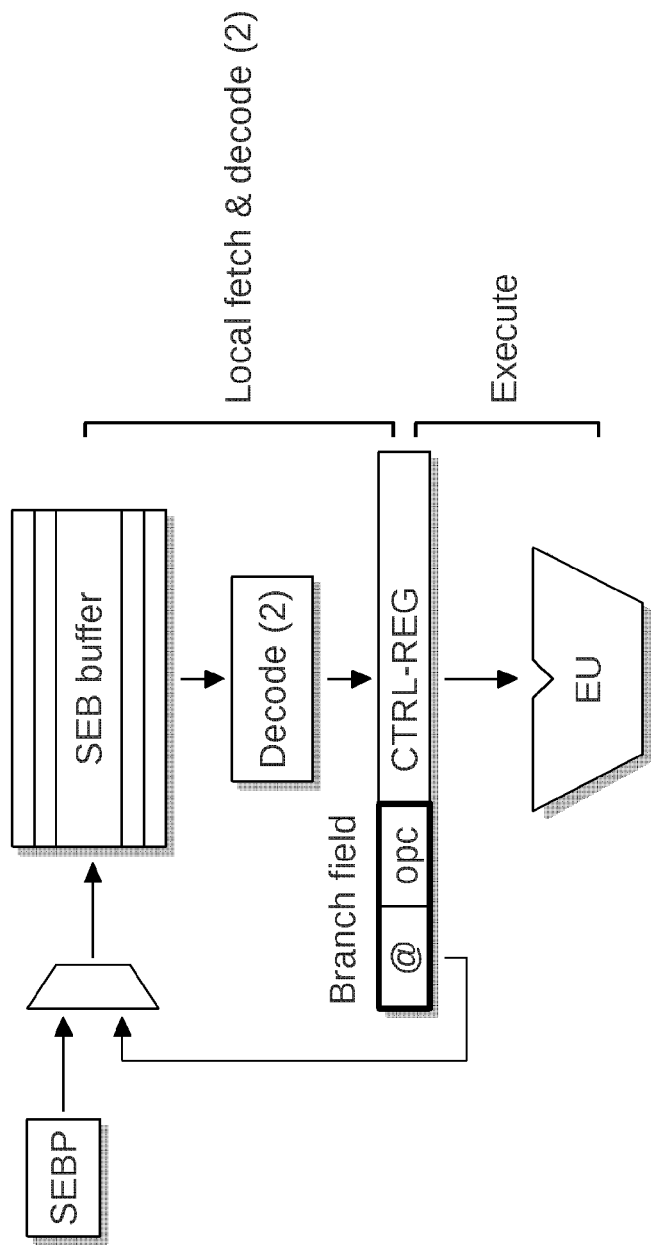
FIG. 14: Local branch with dedicated branch field next to each instruction using an immediate address.

FIG. 14 shows the SEB branch support implementation in the local pipeline. A dedicated branch field is provided with each instruction. It holds an immediate target address for conditional branches together with a branch opcode. At the beginning of the local fetch stage the local controller selects between the next SEP pointer SEBP and the immediate address field of the current instruction @ by means of a multiplexer depending on the branch opcode field, opc.

This local branch using immediate value has two advantages. The first is in power consumption. It is not necessary to maintain a full program counter of 32 bits requiring a 32 bits addition for each executed instruction and another extra addition for each taken branch. With a small local address space it is only necessary to maintain a local counter less than one byte and no addition is required for branches. The second advantage is latency. It is not necessary to use a dedicated pipeline stage for branch target address computation. This makes the next instruction following a branch immediately available with no latency, even in case of conditional branches. Indeed, as shown in FIG. 14 the next sequential address or the branch target address is selected during local memory fetch stage. Therefore, if the branch condition flag is known when the branch instruction is executed, there is no penalty for executing the branch. If the condition flag has to be computed during branch execution, a speculation can be done based on low-cost static prediction. Since this speculation only occurs during fetch stage, no wrong value is computed in execution stage and it is not necessary to have complex state recovering mechanism to cope with wrong speculation.

The branch field is relatively short and takes less than 16 bits to code an immediate target address, a branch opcode and information on flag condition source to use. This limited size is interesting because a branch operation is packed together with an arithmetic or a memory operation in an operation bundle coded as one long instruction. A packed branch operation is very useful when executing tight loop kernels. Indeed, as branch operations are executed together with kernel operations, they do not require a dedicated time slot. Executing a branch has therefore zero execution latency overhead. Together with static prediction, it removes the need for loop unrolling, reducing EB cache occupation and bandwidth.

Efficiently executing tight loops is necessary to parallelize kernels on a set of tiles that can even span over several clusters. When a kernel is parallelized, instruction count per tile decreases and can even reach one in case of spatial computation. In this situation each tile repeatedly executes a single instruction. As explained before, it is possible to reach a single instruction loop in a tile thanks to the zero latency overhead branch execution.

Before an instruction is fetched from the SEB buffer, it is checked for being already present in control register CTRL-REG of the tile. If it is the case, the buffer is not accessed and the tile control register is clock gated. Therefore, in spatial computation when a single instruction is repeatedly executed, there are zero dynamic power consumption from the instruction pipeline and the instruction is simply reused directly from the control register.

In conclusion, local branch in SEB offers strong latency and power efficiency improvements. Indeed, local branch execution penalty is zero cycle when its direction is known before execution and is one cycle when it has to be computed. In the latter case, a speculation can hide this latency and it occurs only in the fetch stage. Furthermore, local branch execution in parallel with instruction causes to have zero cycle used for the branch instruction itself. Therefore, it completely mitigates the problem of branch issue slot in very small kernels and it is not necessary to use unrolling or loop ILP transformations.

EB are successively executed following an execution flow with branches. The EB execution is not sequential, this means that the next EB to execute is not implicitly the one located at the next address. The next following EB to execute when the current one is finished has to be explicitly determined by the execution of a block branch.

EB are executed on a cluster of tiles and an EB execution corresponds to a program execution thread. The execution model allows to execute a single EB/SEB-based program on multiple clusters using multi-threading, in the same way as multicore processors can execute multiple threads of control. Herein, each thread executes a sequence of EB.

EB are made of a header and several SEB code segments. The header gives decoding information which are its size, the used tiles and the instruction format. It can also embed information related to static prediction of the next following block as explained in the following. An EB holds SEB segments for a cluster, making it a two-dimensional code. One dimension is related to tile index and the second to sequential instructions order in SEB. This 2D code has two implementations drawbacks. The first is that cache line organization may not fit cluster size that is furthermore variable in the way that some tiles may not be used. A cache may also be shared by different clusters. Code alignment between cache and tiles may also change by using a compact instruction format for code compaction in less executed parts. The second drawback is that SEB may have very different size in a same EB. Due to those issues, the EB code layout is not completely dependent of a fixed cache implementation. It is also flexible to represent SEB of variable size with a limited use of empty instructions.

The EB code layout is made of a one-dimensional sequence of SEB instructions in the main instruction memory space. Instructions are ordered by their relative address in the EB. Each instruction is prefixed by its SEB index that allows together with their relative address to construct independent SEB segments when EB are loaded on a cluster. During this step, the first EB decoding stage shown in FIG. 12, dispatches SEB instructions to their respective tiles based on the header, their order and their prefix index information. An EB code layout example is given in FIG. 15.

Figure 15:
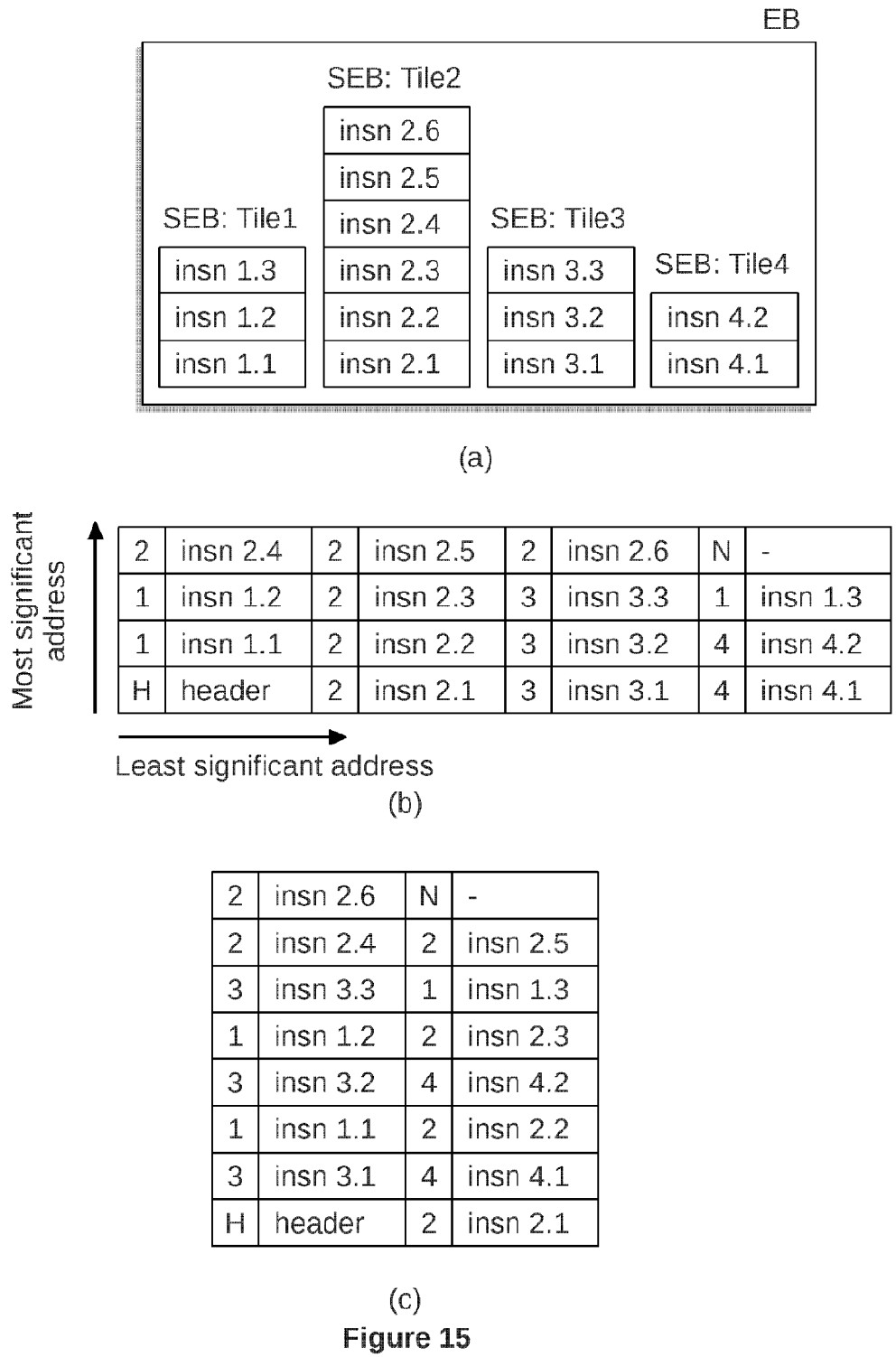
FIG. 15: EB code layout example holding SEB for 4 tiles. (a) represents its SEB content, (b) and (c) are two storage of the same block where in (b) the cache line is 4 instructions wide and 2 instructions wide in (c) though both arrays store the same EB.

The EB content is given in FIG. 15 (a), it holds SEB for a cluster of 4 tiles. Not all its SEB have a same instruction count. Its logical content is made of the sequence of SEB instructions shown in FIG. 15 (b). The least significant address are inside lines while the most significant address increases with line index, this gives to each SEB instruction a relative position the same way atomic instructions are addressed in a cache index space. When two instructions targeting the same tile belong to a same line, the first instruction in the line is loaded first while the second waits for the next cycle. In the example, the two instructions prefixed with tile 1 in the third line of FIG. 15 (b) are ordered so that the first insn 1.2 precedes the second insn 1.3, hence their relative position 2 and 3 in SEB of tile 1.

Physical cache organization independence is shown in FIGS. 15 (b) and (c) where the same EB is stored in two cache implementations. In (b) cache lines are 4 instructions wide and in (c) they are made of only two instructions. Instruction dispatch in the first decode stage using tile prefix allows to pack SEB instructions in EB without having to maintain tile alignment and hence use empty instructions to pad the code. FIGS. 15 (b) and (c) show that only one empty instruction has to be inserted through SEB in FIG. 15 (a) have very different sizes. A trivial aligned implementation would have required 10 empty instructions for 14 useful one, leading to 42% of unused entries.

During EB execution, blocks are loaded line by line from EB cache to SEB buffers using the LINE-REG register shown in FIG. 12. This block layout organized by line allows to already start a SEB execution when the first instruction line has been loaded at the early beginning of an EB execution. Based on the tile index prefix of each instruction, the decoder dispatches instructions to their respective tile even if they are not organized in a line corresponding to the tiles. Tile index prefix is flexible and allows the compiler to place instructions in EB based on cache size and their probable execution slots.

Figure 16:
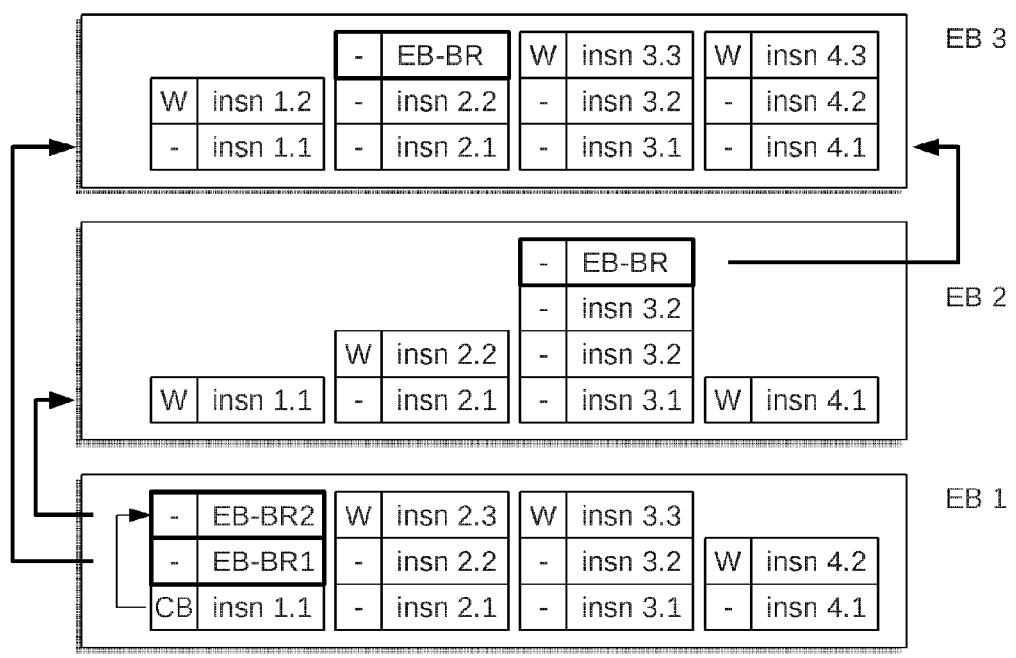
FIG. 16: EB branch example. Only one EB branch instruction is executed in one tile, the other tiles wait for their new SEB.

Together with the two execution levels, there are two branch levels. The SEB level allows to branch between instructions only inside a SEB while at the EB level, branches are performed between EB. An EB branch instruction is executed like a normal instruction and is part of a SEB. Since an EB provides code for an entire cluster, when an EB branch occurs, all the tiles in a cluster must branch to their new SEB. Due to local control in each tiles, a dedicated control instruction has to be executed in each tile of a cluster. Nevertheless, all branch instructions in tiles are not the same. Only one EB branch instruction is executed in only one tile of the cluster, the other tiles wait for the next SEB to be loaded during EB execution. This SEB waiting is implemented by a local branch targeting a reserved address, meaning that the tile waits for the first next SEB instruction to be loaded for execution. An EB branch example is given in FIG. 16.

Three EB are represented with their SEB. In this figure, instruction prefix represents branch field content related to block branches. A conditional branch is noted CB and a wait for a block branch issued in an another tile is noted W. EB branch execution starts in the example by executing a local conditional branch CB together with insn 1.1. If it is taken, the EB branch instruction EB-BR2 is executed, otherwise the following instruction EB-BR1 is executed. EB-BR1 targets EB 3 while EB-BR2 targets EB 2. Independently of this branch outcome, tiles 2, 3 and 4 wait for the new SEB by executing a wait for the new SEB, W branch instruction. Wait for new SEB is executed when the current SEB is finished. EB 2 and EB 3 end both with the execution of an unconditional block branch EB-BR. Note that the wait for the new SEB, W has two functions: (i) allowing the local SEB buffer memory to be safely overwritten by the new SEB without destroying unexecuted instructions. And (ii) to start the execution with the new SEB when at least its first instruction is ready.

When an EB is in the cache and the execution in all tiles is finished, the penalty for an EB branch is four cycles. One cycle to execute the branch instruction that provides a new address to the EB controller, a second cycle to fetch the first block line from EB cache, a third cycle to write it in local SEB buffers, and finally a fourth cycle to locally fetch and write this instruction to the tile control register of the tiles. The first instruction from the new EB is then ready to be executed the next following cycle. It is possible to reduce this branch penalty to three cycles by bypassing the local SEB buffers when a tile is ready, and to directly decode and dispatch instructions to the tile control register. When doing this, a copy of the instruction is still written in the local SEB buffer for a possible future execution that can append due to a local branch.

Figure 17:
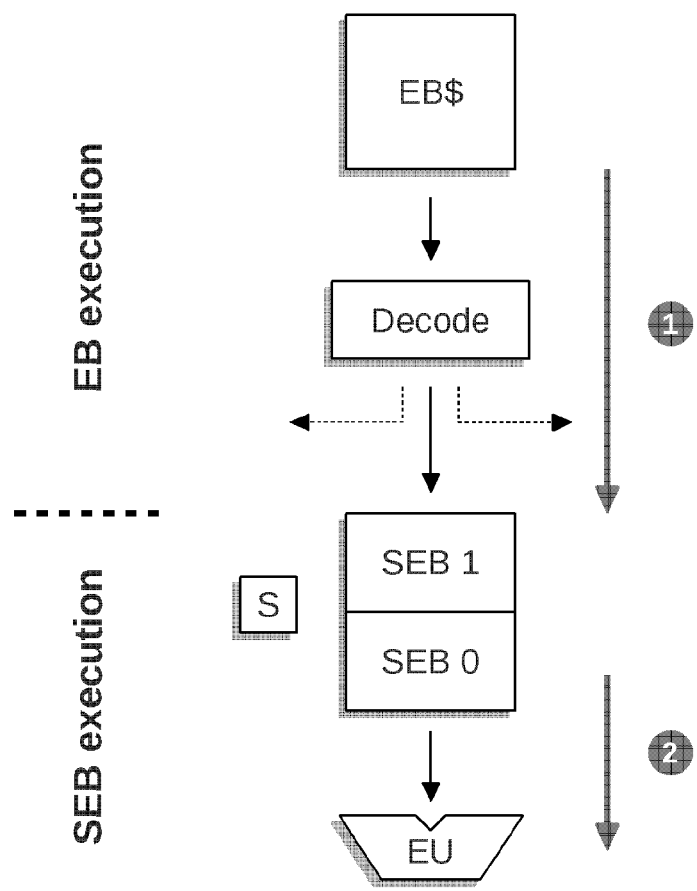
FIG. 17: Double SEB buffer. A new EB is prefetched (1) based on static prediction of the most likely EB to be executed while a current SEB is executed.

Branching between EB cost at least three clock cycles between the EB branch instruction execution to the new SEB execution. In order to mitigate this latency the local SEB buffer is made to hold two SEB. As shown in FIG. 17, the local SEB buffer holds two SEB, SEB 0 and SEB 1. While a SEB is being executed (2), a new one can be loaded in the second part of the buffer (1). A new EB can therefore start to be loaded just after the previous one. The advantage is that when the current SEB has finished its execution and a new one is ready, it can immediately be executed with no penalties. A state bit named S in the figure provides the highest order bit of the local address for the two parts of the buffer. It is toggled with an EB branch that switches between the two parts of the buffer.

In order to prefetch a new EB wile the current one is not finished, it is necessary to provide a new address since the EB execution is not sequential and the EB branch instruction is not yet executed. This address is provided in the header of the current EB as the most likely following block to execute. This corresponds to a static prediction on the following block branch. When the next following EB address matches one of the two EB already in buffers, it is not loaded from the EB cache again but is instead reused directly from the buffer. This block reuse allows to repeatedly execute a loop kernel spanning the two parts of the buffers without incurring the penalty of constantly loading blocks or to only use only half of the buffer for SEB execution. The two part SEB buffer can therefore be fully used.

The next EB address of the block that will likely be executed is recorded at compile-time in the header of the current block. Therefore, an EB branch instruction targeting this block does not need to provide this address again since the compiler knows that it is already present in the header. Therefore, those EB branch instructions are simply implemented as a local branch instruction targeting a reserved local target address. When such a local branch instruction is executed, it is interpreted as a block branch targeting the next predicted block address already in the buffer. Furthermore, it can be executed as a local branch instruction to the first instruction of the other part of the buffer. Therefore, when the static next block prediction is correct and when at least the first next SEB instruction has been prefetched or is valid in the buffer, the block branch penalty is the same as the local branch penalty that is zero cycle.

Although the present invention has been described in considerable detail with reference to certain preferred versions thereof, other versions are possible. Therefore, the spirit and scope of the appended claims should not be limited to the description of the preferred versions contained therein.

The reader's attention is directed to all papers and documents which are filed concurrently with this specification and which are open to public inspection with this specification, and the contents of all such papers and documents are incorporated herein by reference. All features disclosed in this specification (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalent or similar features.

REFERENCES

21. A. Jerraya and W. Wolf, "Multiprocessor Systems-on-Chips". Elsevier, 2004.
31. B. Bougard, B. De Sutter, D. Verkest, L. Van der Perre, and R. Lauwereins, "A Coarse-Grained Array Accelerator for Software-Deffned Radio Baseband Processing", Micro, IEEE, vol. 28, pp. 41-50, July-August 2008.
32. H. Singh, M.-H. Lee, G. Lu, F. Kurdahi, N. Bagherzadeh, and E. Chaves Filho, "MorphoSys: an integrated reconfigurable system for data-parallel and computation-intensive applications", Computers, IEEE Transactions on, vol. 49, pp. 465-481, May 2000.
33. V. Baumgarte, G. Ehlers, F. May, A. N. M. Vorbach, and M. Weinhardt, "PACT XPP—self-reconfigurable data processing architecture", The Journal of Supercomputing, vol. 26, pp. 167-184, September 2003.
34. P. Heysters, G. Smit, E. Molenkamp, and G. Rauwerda, "Flexibility of the Montium Coarse-Grained Reconfigurable Processing Tile", in 4th PROGRESS Symposium on Embedded Systems, Nieuwegein, The Netherlands, pp. 102-108, 2003.
35. M. Butts, "Synchronization through Communication in a Massively Parallel Processor Array", Micro, IEEE, vol. 27, pp. 32-40, September-October 2007.
37. M. Taylor, J. Kim, J. Miller, D. Wentzlaff, F. Ghodrat, B. Greenwald, H. Hoff-man, P. Johnson, J.-W. Lee, W. Lee, A. Ma, A. Saraf, M. Seneski, N. Shnidman, V. Strumpen, M. Frank, S. Amarasinghe, and A. Agarwal, "The Raw microprocessor: a computational fabric for software circuits and general-purpose programs", Micro, IEEE, vol. 22, pp. 25-35, March/April 2002.
60. S. Pasricha and N. Dutt, "On-chip communication architectures: system on chip interconnect". Morgan Kaufmann, 2008.
61. L. Benini and G. D. Micheli, "Networks on Chips: technology and tools". Morgan Kaufmann, 2006.
64. M. Taylor, J. Psota, A. Saraf, N. Shnidman, V. Strumpen, M. Frank, S. Amarasinghe, A. Agarwal, W. Lee, J. Miller, D. Wentzlaff, I. Bratt, B. Greenwald, H. Hoffmann, P. Johnson, and J. Kim, "Evaluation of the Raw microprocessor: an exposed-wire-delay architecture for ILP and streams", in Computer Architecture, 2004. Proceedings. 31st Annual International Symposium on, pp. 2-13, June 2004.
66. M. Butts, A. M. Jones, and P. Wasson, "A structural object programming model, architecture, chip and tools for reconfigurable computing", Field-Programmable Custom Computing Machines, Annual IEEE Symposium on, vol. 0, pp. 55-64, 2007.
67. D. Kissler, F. Hannig, A. Kupriyanov, and J. Teich, "A dynamically reconfigurable weakly programmable processor array architecture template", in International Workshop on Reconfigurable Communication Centric System-on-Chips (ReCoSoC), pp. 31-37, 2006.
71. R. Bajwa, M. Hiraki, H. Kojima, D. Gorny, K. Nitta, A. Shridhar, K. Seki, and K. Sasaki, "Instruction buffering to reduce power in processors for signal processing", Very Large Scale Integration (VLSI) Systems, IEEE Transactions on, vol. 5, pp. 417-424, December 1997.
72. M. Jayapala, F. Barat, T. Vander Aa, F. Catthoor, H. Corporaal, and G. Deconinck, "Clustered loop buffer organization for low energy VLIW embedded processors", Computers, IEEE Transactions on, vol. 54, pp. 672-683, June 2005.
73. T. V. Aa, M. Jayapala, H. Corporaal, F. Catthoor, and G. Deconinck, "Impact of ILP-improving Code Transformations on Instruction Memory Energy", in Proc. of 11th Workshop on Interaction between Compilers and Architectures (INTERACT-11), pp. 443-448, 2007.
78. J. Dennis and D. Misunas, "A preliminary architecture for a basic data-ow processor", ACM SIGARCH Computer Architecture News, vol. 3, no. 4, pp. 126-132, 1974.
79. G. Papadopoulos and D. Culler, "Monsoon: an explicit token-store architecture", in Proceedings of the 17th annual international symposium on Computer Architecture, pp. 82-91, ACM New York, N.Y., USA, 1990.
80. A. Davis, "The architecture and system method of DDM1: A recursively structured Data Driven Machine", in Proceedings of the 5th annual symposium on Computer architecture, pp. 210-215, ACM New York, N.Y., USA, 1978.
81. M. Kishi, H. Yasuhara, and Y. Kawamura, "Dddp-a distributed data driven processor", in Proceedings of the 10th annual international symposium on Computer architecture, pp. 236-242, ACM New York, N.Y., USA, 1983.
82. M. Amamiya, M. Takesue, R. Hasegawa, and H. Mikami, "DFM: the data ow machine highly parallel symbol manipulation", in Proceedings of the 1987 Fall Joint Computer Conference on Exploring technology: today and tomorrow, pp. 602-611, IEEE Computer Society Press Los Alamitos, Calif., USA, 1987.
83. Y. Patt, W. Hwu, and M. Shebanow, "HPS, a new microarchitecture: rationale and introduction", in Proceedings of the 18th annual workshop on Microprogramming, pp. 103-108, ACM New York, N.Y., USA, 1985.
84. Y. Patt, S. Melvin, W. Hwu, and M. Shebanow, "Critical issues regarding HPS, a high performance microarchitecture", in Proceedings of the 18th annual workshop on Microprogramming, pp. 109-116, ACM New York, N.Y., USA, 1985.
85. S. Weiss and J. Smith, "Instruction issue logic for pipelined supercomputers", ACM SIGARCH Computer Architecture News, vol. 12, no. 3, pp. 110-118, 1984.
86. J. Smith and G. Sohi, "The microarchitecture of superscalar processors", Proceedings of the IEEE, vol. 83, no. 12, pp. 1609-1624, 1995.
87. R. Tomasulo, "An e#cient algorithm for exploiting multiple arithmetic units", IBM Journal of research and Development, vol. 11, no. 1, pp. 25-33, 1967.
88. R. Kessler et al., "The alpha 21264 microprocessor", IEEE micro, vol. 19, no. 2, pp. 24-36, 1999.
89. S. McFarling, "Combining branch predictors", tech. rep., Technical Report TN-36, Digital Western Research Laboratory, 1993.
90. J. Smith and A. Pleszkun, "Implementing precise interrupts in pipelined processors", IEEE Transactions on Computers, vol. 37, no. 5, pp. 562-573, 1988.
91. S. Swanson, K. Michelson, A. Schwerin, and M. Oskin, "WaveScalar", in Proceedings of the 36th International Symposium on Microarchitecture (MICRO), Citeseer, 2003.

92. S. Swanson, A. Schwerin, M. Mercaldi, A. Petersen, A. Putnam, K. Michelson, M. Oskin, and S. Eggers, "The wavescalar architecture", ACM Transactions on Computer Systems (TOCS), vol. 25, no. 2, p. 4, 2007.
93. K. Kavi, R. Giorgi, and J. Arul, "Scheduled data ow: execution paradigm, architecture, and performance evaluation", IEEE Transactions on Computers, pp. 834-846, 2001.
94. K. Sankaralingam, R. Nagarajan, H. Liu, C. Kim, J. Huh, D. Burger, S. Keckler, and C. Moore, "Exploiting ILP, TLP, and DLP with the polymorphous TRIPS architecture", in Proceedings of the 30th annual international symposium on Computer architecture, p. 433, ACM, 2003.
95. M. Homewood, D. May, D. Shepherd, and R. Shepherd, "The IMS T 800 transputer.", IEEE Micro, vol. 7, no. 5, pp. 10-26, 1987.
96. A. Duller, G. Panesar, and D. Towner, "Parallel Processing—the picoChip way", Communicating Processing Architectures, pp. 125-138, 2003.
97. Z. Yu, M. Meeuwsen, R. Apperson, O. Sattari, M. Lai, J. Webb, E. Work, D. Truong, T. Mohsenin, and B. Baas, "AsAP: An asynchronous array of simple processors", IEEE Journal of Solid State Circuits, vol. 43, no. 3, p. 695, 2008.
98. M. Butts, B. Budlong, P. Wasson, and E. White, "Reconfigurable Work Farms on a Massively Parallel Processor Array", in Field-Programmable Custom Computing Machines, 2008. FCCM '08. 16th International Symposium on, pp. 206-215, April 2008.
99. "Tilera." http://www.tilera.com.
100. C. Moritz, D. Yeung, and A. Agarwal, "Exploring optimal cost-performance designs for Raw microprocessors", in FPGAs for Custom Computing Machines, 1998. Proceedings. IEEE Symposium on, pp. 12-27, April 1998.
101. H. Corporaal and H. Mulder, "MOVE: A framework for high-performance processor design", in Proceedings of the 1991 ACM/IEEE conference on Supercomputing, pp. 692-701, ACM New York, N.Y., USA, 1991.
102. H. Corporaal and M. Arnold, "Using transport triggered architectures for embedded processor
103. J. Leijten, J. van Meerbergen, A. Timmer, and J. Jess, "PROPHID: a datadriven multi-processor architecture for high-performance DSP", in Proceedings of the 1997 European conference on Design and Test, IEEE Computer Society Washington, D.C., USA, 1997.
104. K. Goossens, J. Dielissen, and A. Radulescu, "Aethereal network on chip: concepts, architectures, and implementations", IEEE Design and Test of Computers, vol. 22, no. 5, pp. 414-421, 2005.
105. W. Hwu, S. Mahlke, W. Chen, P. Chang, N. Warter, R. Bringmann, R. Ouellette, R. Hank, T. Kiyohara, G. Haab, et al., "The superblock: an effective technique for VLIW and superscalar compilation", The Journal of Supercomputing, vol. 7, no. 1, pp. 229-248, 1993.

The invention claimed is:
1. A processor allowing to execute in parallel instructions from a single thread of instruction bundles, comprising:
an instruction memory comprising a plurality of instruction bundles comprising one or more instructions;
a plurality of point-to-point communication means, hereafter called data communication links, wherein data can be stored, comprising
a write port wherein data can be written by performing a write operation and wherein information about write operation availability can be obtained, and
a read port wherein data can be read following a predefined order in relation to the sequence of write operations previously performed on said write port by performing a read operation and wherein information about read operation availability can be obtained; and
a plurality of processing means, hereafter called processing elements,
wherein a single instruction of said instruction bundle is executed by processing input data exclusively obtained from one or more said data communication link read ports and by writing the data produced by the execution exclusively to one or more said data communication link write ports,
wherein said read ports providing said input data are selected based on instruction data,
wherein said write ports where said result will be written are selected based on instruction data,
wherein data stored in the data communication links can be explicitly managed by performing said read and write operations provided by said data communication links based on instruction data,
wherein each instruction comprises
a field defining the operation to perform,
a plurality of fields, one for each operand, each comprising first and second binary values, the first binary value defining the data communication link read port that will be selected by the processing element executing said instruction to obtain a corresponding operand, and the second binary value indicating if a read operation should be performed on the selected read port,
a single field comprising a plurality of bits, one for each processor data communication link, wherein each bit defines whether the operation result should be written to the corresponding write ports of said data communication links,
wherein data communications between instructions executed on said processing elements are only performed using said data communication links,
wherein said instruction executions on said processing elements are synchronized based on read and write operation availability information provided by said data communication links,
wherein there is one of said processing elements that is a branch unit providing an address of a next said instruction bundle to execute.
2. The processor of claim 1, wherein the processor comprises two or more of said instruction memories, each storing a plurality of instruction bundles from one or more threads,
wherein the processor executes instructions in parallel from one or more threads of instruction bundles,
wherein for each of said instruction memories, there is one of said processing elements that is a branch unit providing an address of a next said instruction bundle to execute.
3. The processor of claim 2,
wherein said processing elements are further grouped in tiles,
wherein a set of said data communication link read ports are connected to said tile inputs and are shared between said tile processing elements,
wherein a set of said data communication link write ports are connected to said tile outputs and are shared between said tile processing elements,
wherein one or more of said data communication links have their write ports connected to one tile output, and their read ports connected to a different tile input, and wherein said instructions executed in a same said tile follows a predefined order based on priority specified in said executed instruction data.

4. The processor of claim 3, wherein said tiles are further grouped in clusters, each comprising
a single instruction memory, and
a single branch unit processing element,
wherein said cluster instruction memory provides an instruction bundle to each said cluster tiles based on said address provided by said cluster branch unit.

5. The processor of claim 4, wherein some processing elements are storage means allowing to store program long-living variables.

6. The processor of claim 5, wherein data communication links can perform additional operations comprising
a data read operation that does not consume data stored in said communication link,
a data write operation that forces a write operation in said data communication link even when write operation is not available, and
a flush operation that erase all data stored in said data communication links.

7. The processor of claim 6,
wherein each processing element further comprises one control mean providing control signals based on instruction data, processing element input data communication link read ports availability information, and processing element output data communication link write ports availability information,
wherein each tile further comprises one control mean providing control signals to handle instruction execution coordination in the processings elements and providing a control signal notifying the last execution cycle for the instruction executed in the processing element,
wherein each cluster further comprises a control mean providing a control signal notifying that the cluster is allowed to execute the next instruction, based on control signals provided by said tile control means.

8. The processor of claim 7, wherein all control means are centralized in a single control mean.

9. The processor of claim 7, further comprising:
one selection mean, comprising
one or several input ports connected to said data communication link read ports, and
one or several output ports connected to processing element inputs,
wherein information is provided to each said processing element control mean about one or more said data communication link read port read operation availabilities, based on control signals from said processing element control mean,
wherein data from one or more said data communication link read port is provided to each said processing element input based on control signals from said processing element control mean, and
wherein operations are performed on said data communication link read ports based on control signals from said processing element control mean; and
one distribution mean, comprising
one or several input ports connected to processing element outputs and said processing element control means, and
comprising one or several output ports connected to said data communication link write ports,
wherein information is provided to each said processing element control mean about said data communication link write port write operation availabilities,
wherein data is provided to one or several said data communication link write ports from said processing element outputs based on control signals from said processing element control means, and
wherein operations are performed on said data communication link write ports based on control signals from said processing element control mean.

10. The processor of claim 9,
wherein each tile further comprises a plurality of selection means and wherein each tile processing element inputs are partitioned in one or several groups, and a separate said selection mean is attributed to each group and only a subset of all tile data communication link read ports is connected to said selection mean inputs, and
wherein each tile further comprises a plurality of distribution means wherein data communication link write ports are partitioned in several groups, and one separate said distribution mean is attributed to each group, and where only a subset of processing element outputs are connected to said distribution mean inputs.

11. The processor of claim 7, wherein said instruction memories provide signals to the cluster control means notifying the availability of the fetched instruction bundle.

12. A method allowing to execute a program on the processor of claim 4, the method comprising:
a) reading an instruction bundle from each cluster instruction memory;
b) executing the instructions in processing elements when the data communication links specified by the instructions providing data to said processing elements are all available for read operations and data communication links specified by the instructions that receives the data computed by the processing elements are all available for write operations;
c) performing a write operation on the data communication links where data is distributed, as specified by the instructions;
d) performing a read operation on the data communication links from where data is provided to the functional units, as specified by the instructions;
e) computing the address of the next instruction bundle to fetch in the branch unit; and
f) requesting a fetch of the next instruction bundle when all instructions from the current bundle are executed.

13. The method of claim 12, the instruction execution step further restricting instruction execution inside each tile with the verification that instructions executed in said tile can be executed only if all other instructions with a higher priority in said tile have been executed first.

* * * * *